US007980153B2

(12) United States Patent
Ehrlich et al.

(10) Patent No.: US 7,980,153 B2
(45) Date of Patent: Jul. 19, 2011

(54) ACTUATION SYSTEM FOR A GEARBOX

(75) Inventors: Matthias Ehrlich, Buhl (DE); Norbert Esly, Buhl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1535 days.

(21) Appl. No.: 10/906,282

(22) Filed: Feb. 11, 2005

(65) Prior Publication Data

US 2005/0178229 A1 Aug. 18, 2005

(30) Foreign Application Priority Data

Feb. 13, 2004 (DE) ......................... 10 2004 007 102

(51) Int. Cl.
*F16H 61/28* (2006.01)

(52) U.S. Cl. ....................... 74/473.1; 74/335; 74/473.19

(58) Field of Classification Search .................... 74/335, 74/473.1, 473.11, 473.12, 473.19
See application file for complete search history.

(56) References Cited

U.S. PATENT DOCUMENTS 4,060,005 A * 11/1977 Bost ................................ 74/745
5,878,622 A * 3/1999 Tischer ........................... 74/335

FOREIGN PATENT DOCUMENTS

| | | |
|---|---|---|
| DE | 10206561 | 10/2002 |
| DE | 10206536 A1 | 8/2003 |
| DE | 10231547 | 1/2004 |
| EP | 1236936 | 9/2002 |
| EP | 1308651 | 5/2003 |
| JP | 2004225365 | 8/2004 |

* cited by examiner

*Primary Examiner* — William C Joyce
(74) *Attorney, Agent, or Firm* — Simpson & Simpson, PLLC

(57) ABSTRACT

An actuator device for a motor vehicle transmission, the motor vehicle transmission having:—at least two shafts;—a plurality of gear sets for the achievement of different gear steps;—a plurality of shift mechanisms that may be operated to produce or release a rotationally fixed shaft-gear connection; the actuator device having:—a plurality of output elements that can be moved in order to operatively engage in shift mechanisms of the transmission—a main actuator device having at least one main actuator element that is movable for the engagement of gears, the main actuator element preferably being an output element—a secondary actuator device having at least one movably mounted secondary actuator element, which is movable for the disengagement of gears, the at least one secondary actuator element preferably being an output element, the main actuator device and the secondary actuator device cooperating to produce controlled relative movements of at least two output elements.

28 Claims, 13 Drawing Sheets

ACTUATION SYSTEM FOR A GEARBOX

CROSS-REFERENCE TO RELATED APPLICATIONS

This patent claims priority of German Patent Application No. 10 2004 007 102.0, filed Feb. 13, 2004, which application is incorporated herein by reference.

BACKGROUND OF THE INVENTION

This invention relates to an actuator device for a transmission, a transmission device and a vehicle drive train having such an actuator device, as well as a procedure for determining the shift pattern of a transmission for control purposes.

In DE 102 06 536 A1 (FIG. 2 of DE 102 06 536 A1) of the applicant, a vehicle transmission device comprising a transmission and an actuator device for operation of this transmission is shown. The actuator device has a shifting shaft from which two shift fingers and two double cams project, axially displaced from the shift fingers. The shift fingers and the double cams are each fixedly joined to the shifting shaft. The transmission is formed as a twin-clutch transmission and shows two partial transmissions, which are each provided with a plurality of shift mechanisms (final output mechanisms). The shift mechanisms of the transmission each have a shift fork. The shift forks each have a shift mouthpiece that exhibits a first region provided with a first contour and a second region provided with a second contour.

To engage a gear in the transmission, the shift finger, via axial displacement of the shifting shaft, is moved into the shift mouthpiece of the shift mechanism that is assigned to the target gear. By subsequent swiveling of the shifting shaft, the shift finger engages in the first region of this shift mouthpiece and moves the shift fork in such a manner that the target gear is engaged. The double cam, which also rotates because of the swiveling movement, engages in the second region of another shift mouthpiece of the same partial transmission and cooperates with its contour so that the other gears of the same partial transmission are disengaged before the target gear is engaged via the shift finger. As in the design known from FIG. 2 of DE 102 06 536 A1, there exists the not inconsiderable danger that the double cams may jam in the shift mouthpieces, which may lead to a functional failure of this design.

OBJECT OF THE INVENTION

The object of the present invention is to provide a reliable transmission device having an actuator device and to provide a reliable actuator device for a transmission, such as a vehicle transmission.

BRIEF SUMMARY OF THE INVENTION

According to the invention, an actuator device is proposed, as well as a transmission device. A vehicle drive train according to the invention also is described. A method according to the invention also is described. Preferred embodiments are the subject matter of the dependent claims.

The plurality of output elements that are different from each other engage directly in shift mechanisms, especially the shift fork or shift rail of the shift mechanisms, for operative engagement in these shift mechanisms.

In a preferred embodiment, the main actuator element is an output element of the actuator device, so that it can directly, and preferably as desired, operatively engage the shift mechanisms. However, it may also be provided that the main actuator element is not an output element, whereby provision is then made in particular that it can be moved in order to effect—especially by means of the secondary actuator device—movements of a particular output element.

Preferably, there is a separate output element for each shift mechanism of the transmission, especially a secondary actuator element, which preferably is permanently engaged with the particular shift mechanism or shift rail or shift fork of the shift mechanism. In an advantageous embodiment, each secondary actuator element forms a separate output element of the actuator device. The output elements preferentially form the interfaces of the actuator device with the transmission.

The secondary actuator element(s) can be moved, in an advantageous embodiment, in order to disengage the gears of the transmission or partial transmission.

In an advantageous embodiment, the main actuator device and the secondary actuator device cooperate to produce controlled relative movements of the output element in such a way that at least one output element that may be moved to disengage a gear will be more quickly moved to disengage the gear in its engagement section for engagement in a shift mechanism than an output element—especially every other one—which is moved to disengage a gear in its engagement section for engagement in a shift mechanism—especially every other one.

Furthermore, it is especially preferred that the main actuator device and the secondary actuator device cooperate to produce controlled relative movements of the output elements in such a way that different output elements—especially for the actuation of different shift mechanisms of a transmission or an equivalent partial transmission—simultaneously can be moved or are moved in relation to each other.

Especially preferably, the main actuation device and the secondary actuation device cooperate to produce controlled relative movements of the output elements in such a manner that the main actuation device directly moves or can move an output element that in some cases is a component of the main actuation device and/or of the main actuation element, and at least one other output element can move or moves via the secondary actuation device. In an especially advantageous embodiment, the output elements that are moved relative to each other in so doing cooperate with different shift mechanisms of the transmission.

In an advantageous embodiment, the main actuator device shows, in an optimum configuration, a shift element on which a main actuator element is formed, and on which at least one surface contour has been formed for cooperating with at least one surface contour of the secondary actuator device. It may be provided that the main actuator device is such a shift element and that it is preferably a single piece. It may also be provided that such a shift element can be carried by a shifting shaft and is formed together with it as a single piece. Furthermore, it may be provided that such a shift element is produced separately from such a shifting shaft and is essentially fixedly joined to it, in particular rotationally fixedly and axially fixedly joined to it. In a design of this type, the surface sections of the main and secondary element cooperate in such a way that a controlled relative movement will always be achieved, independent of the rotational direction of the main actuator element, if the secondary actuator element is located in a final position, for example, with one of the two gears engaged that can be engaged by a shift rail.

In a preferred embodiment, the main actuator element is formed in the manner of a finger, or is a shift finger. In the preferred embodiment such a shift finger exhibits an involute shape. It may be provided that such a shift finger is destined for engagement in the shift mouthpieces of shift mechanisms of a transmission in order to task these shift mouthpieces or shift mechanisms with shifting gears; in this context the shift mouthpieces may in particular be present on or in shift rails or shift forks. However, it may also be provided that such a shift finger can act upon the secondary actuator device and thereby cause a secondary actuator element of the secondary actuator device to thereby be able to cause a shift mechanism of a transmission to move into a gear position. Advantageously, it is provided that the shift finger essentially only acts to shift the gears in the transmission, and not to disengage the gears. However, it may also be provided that the shift finger, when a gear assigned to a particular shift gate is being engaged, will automatically engage another gear assigned to the same shift gate.

Advantageously, the main actuator element, or shift finger, may be moved corresponding to a shift gate/select gate layout or a corresponding shift pattern of the transmission and/or partial transmission. In this context it may provided in particular that the shift finger or the main actuator element may be moved for the selection or in a select gate direction or within a shift gate, and specifically, preferably even if a gear of the transmission and/or partial transmission and/or one gear in every partial transmission is engaged. In regard to transmissions that are disposed as parallel drive train sections of motor vehicle drive train, this may in particular be such that the shift finger may be moved in the select direction in relation to one of these partial transmissions if a gear is engaged in this partial transmission. In regard to transmissions that do not have the same type of parallel drive train branches, as for example automated-shift transmissions or manual shift transmissions, and in which only one gear of the transmission may be engaged at any one time, it is provided in particular that the shift finger or the main actuator element may be moved in the select direction if a gear of the transmission is engaged. It is also provided in particular that the main actuator element or shift finger may be moved in the shift direction without in the process disengaging an engaged gear of the transmission or partial transmission to which a corresponding shift gate, in which the shift finger is located, is assigned. It may in particular be the case that the main actuator element or shift finger may be moved in the shift direction or in a shift gate in such a way that a gear of the transmission is engaged and then—especially in this shift gate—may be moved into its neutral position, without in the process disengaging the previously shifted gear of the transmission. It may also be provided that the shift element or the main actuator element after this downshifting may be moved into a neutral position or a neutral region in the select direction without in the process disengaging the previously engaged gear. Advantageously, the at least one surface profile of the main actuator device or the shift element which is designated for cooperation with the surface profiles of the secondary actuator device is symmetrically formed.

In this regard, it should be noted that the main actuator mechanism or the shift element advantageously has several surface profiles for the cooperation with the secondary actuator device. These are, in an especially advantageous embodiment, all identically configured; they may be disposed, for example, on different elements, such as disengagement levers, of the secondary actuator device. At any rate, for the sake of simplicity, each of the surface profiles will be discussed below. As mentioned earlier, the main actuator device may have or be a shift element. In this regard, it should be noted that the main actuator device could also be configured differently. At any rate, for the sake of simplicity, it will be referred to below as a “shift element”.

Several surface profiles of the shift element, which are designed for cooperation with the surface profiles of the disengagement elements, especially disengagement levers, are preferably all identical in shape. The surface profiles of different disengagement elements or levers, which are provided for cooperating with surface contours of the shift element, are preferably all identical in shape.

The surface profile of the main actuator device as well as the main actuator element or the shift finger are disposed in an advantageous embodiment in such a manner that they may be swiveled and moved along the swivel axis. This is preferably so that the shift element may be mounted such that it may swivel and be axially movable, and one or more surface sections, which extend at least partially around the swivel axis on the outer surface of the shift element, may be formed as a surface profile. The shift finger may, for example, be arranged in such a manner that it protrudes outwards from the shift element. If such a shift element is swiveled, the shift finger or surface profile will swivel as well. The same applies to the axial displacement of the shift element. The shift element may, for example, be carried by a swivel-mounted or rotatably mounted shaft, which may also be displaced axially. In order to produce this axial movement of the shifting shaft and the swiveling movement of the shifting shaft, electric motors, for example, may be used.

In an advantageous embodiment, the secondary actuator device has several output elements that are disposed in such a way so that they can move relative to each other, like disengagement levers that are each able to swivel, or is formed from such disengagement elements. Furthermore, it may also be provided that the secondary actuator device may also have one or more shafts that carry such disengagement elements. In a preferred embodiment, a secondary actuator element is formed on each disengagement element. The secondary actuator elements may, for example, be shaped like fingers, that is, they may in particular be shaped as disengagement fingers for the particular engagement in a shift mechanism of the transmission. It may be provided in particular that these disengagement fingers are intended to engage in a mouthpiece, like a shift mouthpiece or disengagement mouthpiece, of a final output mechanism or a shift mechanism of a transmission. Such mouthpieces may be disposed in particular on shift rails or shift forks of the shift mechanisms, or final actuator mechanisms of the transmission. In particular, the mouthpieces are cutouts.

The disengagement finger is a secondary actuator element. It should be noted, however, that the secondary actuator element may also be formed in a different way, that is, not in the shape of a finger. For example, the secondary actuator element may form a mouthpiece, or cutout, that can act in conjunction with any finger mounted on the shift mechanisms or shift rails or shift forks, which represents the reverse, to a degree, of the previously mentioned embodiment.

In a preferred embodiment, the disengagement elements are always essentially identically formed, or at least with respect to their surface profile and their secondary actuator element or disengagement finger. In the preferred embodiment, the disengagement elements each form a surface profile of the main actuator element that acts in conjunction with a surface profile of the main actuator element or the shift element. It is especially preferred that the release elements be formed of a single piece together with their surface profile and the disengagement finger. The swiveling of the release elements is advantageously such that during such swiveling, the disengagement finger and the profile are swiveled. In an especially advantageous embodiment, the disengagement elements, especially release levers or release fingers or surface profiles of the secondary actuator device or secondary actuator element, are able to swivel and are essentially fixedly mounted with respect to their swivel axes. It is advantageous if a plurality of disengagement levers is carried by a common shaft and they are swivel-mounted with respect to its longitudinal axis. It is especially advantageous in this context if these disengagement levers are also disposed with respect to this longitudinal axis so that they swivel in relation to each other. This may be accomplished, for example, in such a manner that the shaft that carries the disengagement levers is rotationally fixedly mounted and the disengagement levers of this shaft are each rotatably mounted.

It is especially advantageous if the swivel axes of the swivel-mounted disengagement levers are disposed at a distance from the swivel axis of a swivel-mounted shift element, and in some cases parallel to it. The swivel axes of the disengagement levers may be disposed parallel to each other and in some cases concentrically with respect to each other. In a preferred embodiment, the disengagement fingers of the disengagement levers form radial contact surfaces for operative contact with a mouthpiece or cutout of a particular shift mechanism. It is especially preferably provided that such shift mouthpieces or disengagement mouthpieces be formed as depressions that are bounded by straight or flat flanks along their operational directions. In this context the radial contact surfaces especially preferably operatively engage with these flat surfaces or straight cutouts in such a manner that the particular shift mechanism, via the flat surfaces and the radial contact surfaces, may be moved into a neutral position by means of the disengagement lever, the operative contact between the disengagement lever and the mouthpiece, such as a disengagement mouthpiece or cutout, being accomplished essentially only via the radial contact surfaces and the flat surfaces. In an especially advantageous embodiment, these flat flanks are all disposed perpendicular to the direction of motion of the shift rails or shift forks. Preferably, it is provided that each of the disengagement levers, especially via the particular disengagement finger, is permanently engaged with a shift mechanism of the transmission, or a shift fork or shift rail. Therefore, it is preferably provided that the number of disengagement levers corresponds to the number of shift mechanisms or shift forks or shift rails. In an especially preferred embodiment, exactly one single shift element is provided that can enter into operative engagement with each of the disengagement elements or levers and especially to disengage the gears.

It is advantageous that at least one surface profile of the shift element is disposed axially offset from the shift finger of this shift element.

It is especially preferably provided that the shift fingers, in both orientations of the axial directions of the shift element, in particular of the swivel axis of the shift element, are provided at least one surface profile for acting in conjunction with the surface profiles of the disengagement elements. It may be provided that a clearance is formed in, especially only in, the axial region of the shift element in which the shift finger is disposed, where no surface profiles of the shift element are provided for the operative engagement in the surface profiles of the disengagement elements or disengagement levers. In this context, it may be provided, for example, that this clearance in the axial direction of the shift element be flanked on both sides by regions in which at least one surface profile is provided for acting in conjunction with the surface profiles of the disengagement elements. Advantageously, the clearance is formed in such a manner that a swivel-mounted disengagement lever can swivel within the clearance space. Such a release lever that swivels in this clearance space is preferably one that—currently—engages with its release finger in the same particular shift mechanism of the transmission as the shift finger. It may then be provided that, if the shift finger is swiveled to effectuate a gear position in the transmission using the associated shift mechanism in question to which the gear is assigned, then the disengagement finger in question will be carried along, causing the disengagement lever to which this disengagement finger is assigned to swivel in the clearance space of the shift element. Especially advantageously, it is provided that with each such movement, the axially displaced surface profiles of the shift element act in conjunction with the surface profiles of other disengagement levers in such a way that these other disengagement levers are positioned so that the assigned shift mechanisms cause the gears of the transmission assigned to these shift mechanisms to be or become disengaged. It may be that this is valid for all the disengagement levers or shift mechanisms or gears of the transmission that are not assigned to the shift gate in which the shift finger is located, or that it is valid only for those of the same partial transmission that are not assigned to the aforementioned shift gate.

Preferably, the surface profiles cooperate so that, during prescribed swivel movements of the shift element for engaging a gear in the transmission, the surface profile of the shift element is swiveled along in such a manner that it engages in the surface profiles of the disengagement levers that engage the same transmission or partial transmission and shift gates, which are different from those of the target gear, in such a way that these are carried along in the swiveling as long as they are not in a position which corresponds to a disengagement position. Through this carrying along, the disengagement levers are moved into their disengagement position, so that all disengagement levers are in a disengagement position before the target gear is engaged. The disengagement levers are preferably held in the disengagement position via the cooperation of the surface profiles. The surface profiles preferably cooperate like a kind of forced guidance. During the movement of a shift finger for the engagement of a gear, the surface profile of the shift element preferably takes along the disengagement levers that act in other shift gates of the same transmission or partial transmission through their surface profiles, in order to move these into a disengagement or locked position as long as they are not already in such a position.

Preferably, the surface profiles of the shift element and the surface profiles of the disengagement lever each have disengagement flanks, whereby disengagement flanks of the shift element are able to cooperate with disengagement flanks of one or a plurality of disengagement levers, so that the shift mechanisms of the transmission that are assigned to the associated disengagement levers may be moved in such a way that the gears assigned to these shift mechanisms are disengaged. Furthermore, in a preferred embodiment, the surface profiles of the shift element have locking regions. These may for example be constructed from cylindrical surfaces or cylindrically segmented surfaces. In this context, the surface profiles of the disengagement lever preferentially have locking flanks, whereby the regions of the shift element are able to cooperate with the barrier flanks of one or more disengagement levers in such a way that the associated disengagement lever is hindered from movement. This may especially be so that the associated disengagement lever is hindered from making a swiveling movement. This locking position is preferably such that the disengagement lever in its locking position keeps the assigned shift mechanism of the transmission in a position in which the transmission gears assigned to this shift mechanism are disengaged.

In an especially advantageous embodiment, it is provided that the shift element may be swiveled in a position in which, via the cooperation of the surface profiles, a disengagement lever is in a locking position without disengaging the locking position of the associated disengagement lever. The disengagement levers and the shift element are preferably formed and disposed in such a manner that the shift element may be moved axially in a prescribed position or in a prescribed position region, a neutral position or a neutral position region, without being hindered in this movement by the disengagement levers, and of course independent of the current position of the disengagement lever.

In a preferred embodiment, the main actuator device has n disengagement elements, such as disengagement levers, that are all provided with a surface profile for cooperating with a surface profile of the shift element, as well as with a disengagement finger or the equivalent. In this advantageous embodiment, it is provided that, during a movement of the shift element or shift finger from a neutral position to a gear position, at least one surface profile of the shift element cooperating with the surface profiles of (n−1) disengagement levers for the disengagement and/or locking of these transmission gears assigned to these (n−1) disengagement levers. In this context n is a natural number that is larger than 1. n may be, for example, 2 or 3 or 4 or 5. This embodiment is especially preferred in such transmissions or transmission devices, in which only a single gear of the transmission may be shifted at a time. This may be the case, for example, in a manual shift transmission or an automated-shift transmission (ASG).

The cooperation of the profiles for the disengagement and/or locking of gears preferably takes place during a movement of the shift element or shift finger in the shift direction or in the shift gate direction. Therefore it is especially provided that the disengagement movement rushes ahead of the engagement movement so that the shift mechanisms of the transmission are acted upon in such a way that it is assured that all (other) gears of the transmission are disengaged before the target gear is engaged. According to a further, especially preferred embodiment, it is provided that the actuator device has n disengagement elements or disengagement levers for cooperating with n shift mechanisms of a first partial transmission of a parallel-shift transmission (PSG) or twin-clutch transmission (DKG), as well as m disengagement elements or disengagement levers that are different for cooperating with m shift mechanisms of a second partial transmission of this parallel-shift transmission or twin-clutch transmission. In this context, all of these disengagement levers have a surface profile for the cooperation with one or more surface profiles of the shift element, as well as a secondary actuation element or disengagement finger. In this embodiment, it is provided that at least one surface profile of the shift element cooperates with the surface profiles of (n−1) of the n disengagement levers for the first partial transmission to disengage and/or lock gears of the first partial transmission assigned to these (n−1) disengagement levers if the shift element or the shift finger is moved from a neutral position to a gear position for the engagement of a gear of the first partial transmission. It is correspondingly valid, according to this preferred embodiment for the cooperation of surface profiles of the shift element with the surface profiles of the disengagement lever for the other partial transmission, if a shift element or the shift finger is moved from a neutral position into a gear position for engagement of a gear of this second partial transmission; in this case, however, at least one surface profile of the shift element cooperates with the (m−1) profiles of the m disengagement levers. In this context, n and m are each natural numbers that are larger than one. For example, n and m may be 2 or 3 or 4 or 5, whereby it may be provided that n and m are identical to, or different from each other. This embodiment is especially advantageous in transmissions in which a plurality of partial transmissions exist, which are disposed in particular in parallel-shifted drive train branches, and in which only a single gear may be shifted in each of the partial transmissions at any one time. It is also preferably provided in this preferred embodiment that the cooperation of the surface profiles takes place during a movement of the shift element or shift finger in the shift direction or shift gate direction. This arrangement is especially useful for twin-clutch transmissions or parallel transmissions.

In these previously mentioned embodiments, the actuator device is especially formed in such a way that each gear of the transmission or partial transmission may be engaged via the actuator device, whereby it is ensured that in the aforementioned manner, all the other gears of the transmission or partial transmission are disengaged before the target gear is engaged. It is preferably provided that, in a parallel transmission, a main actuator device is provided with a main actuator element for the operation of both partial transmissions. For example, it may be provided that exactly one shift finger is provided with which the gears of both partial transmissions may be engaged.

In an especially preferable embodiment, the actuator device has a plurality of disengagement elements or disengagement levers for a first partial transmission, and a plurality of disengagement levers or disengagement elements for a second partial transmission, whereby a partition wall is provided between the disengagement levers for the first partial transmission on the one hand, and the disengagement elements for the second partial transmission on the other. This partition wall may be provided with an opening, which is formed in such a way that the shift element, in pre-determined swivel positions, can axially pass through it while being hindered from passing through it in other swivel positions.

The prescribed swivel movements of the shift finger, with which an operative connection is effected between a surface profile of the shift element and one or more surface profiles of one or more disengagement levers for the disengagement and/or locking of prescribed gears of the transmission, are preferably those through which a gear of the transmission may be engaged by means of the shift finger. The disengagement and/or locking of other gears, and in particular those that are assigned to other shift gates, is preferably effected in such a way that it is assured that these other gears are disengaged or locked before a single gear is engaged by means of the shift finger. This occurs preferably in such a way that it is assured that exactly only one gear of the transmission may be engaged at a time, or, in cases of transmissions whose partial transmissions are disposed in different parallel drive train branches such as twin-clutch or parallel-shift transmissions, only exactly one of each partial transmission. In an especially preferred embodiment, this disengagement or locking of gears of other shift gates does not occur until the movement of the shift finger in the shift gate or gear gate of the target gear.

Preferably, the surface profiles of the shift element and the disengagement levers that can cooperate are free of undercuts.

Furthermore, according to the invention, a functional unit for the operation of two partial transmissions is especially proposed, whereby the shifting and disengagement of gears is accomplished by component parts that are separated yet cooperate. Such an embodiment may be designed in a preferred embodiment, as will be explained in another section.

Furthermore, according to the invention, a transmission device is proposed.

The main actuator device element or the shift finger may preferably be moved in the shift direction while engaged in a gear in the transmission without this engaged gear having to become disengaged. It may especially be provided that the main actuation device or the shift finger of a gear position of this main actuation element or this shift finger may be moved into a neutral position of the main actuation element without disengaging a shifted gear of the transmission by means of this movement. Therefore it may be provided that the shift finger may be moved out of its neutral position in a select direction in order to run into a position from which it may be moved into another shift gate in order to trigger the engagement of another gear in the operation. It is preferably provided that, during this movement in the other shift gate and before the new target gear is engaged, the shift mechanism to which the gear has been assigned which has previously been engaged in the same transmission or partial transmission, is acted upon by the cooperation of the main and secondary actuator device, and in particular in such a way that this gear is disengaged before the new gear in the same transmission or partial transmission is shifted. In this way, it may be assured that all the gears of the transmission or of the same partial transmission that are assigned to shift gates which are different from those of the target gear are disengaged before the target gear is engaged.

Preferably, the main actuator element or the shift finger may be moved for shifting in a shift direction and for selecting in a select direction. In a preferred embodiment, it is provided that in each of the shift mechanisms at least one cutout or mouthpiece, like a shift mouthpiece or disengagement mouthpiece, will always be formed for cooperation with the actuator device. Disengagement elements of the actuator device can engage in these mouthpieces or cutouts. It may be provided in particular that, during a movement of an associated output element, a corresponding shift mechanism will be moved via the engagement in these mouthpieces or cutouts. Preferably, the shift mechanisms each have a shift rail or shift fork that is a component of the shift mechanism and therefore of the transmission, at least one mouthpiece or cutout being formed in these shift rails or forks for the cooperation with the actuator device. In a preferred embodiment, each of the disengagement elements or disengagement fingers of the actuator device are permanently engaged with a cutout or mouthpiece, like a disengagement mouthpiece, of a shift mechanism assigned to this disengagement element. This may be such that in every shift mechanism a disengagement element is always permanently engaged. It may also be provided that the shift mechanisms, and in particular the shift forks or shift rails each have two mouthpieces or cutouts. In this context, it may be provided that a disengagement finger of the actuator device permanently engages in the first of these mouthpieces or cutouts, and a shift finger can engage in the second mouthpieces or cutout. It is especially preferably provided in this context that the shift finger may be moved in such a way that it can be brought to engage with different mouthpieces as desired in order to act via these mouthpieces or cutouts on each shift mechanism in such a way that a gear of the transmission is engaged. Preferably, a swiveling movement of the shift element or shift finger corresponds to a movement in the shift direction, and a translatory movement of the shift element or shift finger to a movement of the shift finger or main actuator element in the selected direction. This translatory movement is preferably directed in the direction of the swivel axis of the swivel movement.

In an especially preferred embodiment, the shifting of a gear of the transmission via a shift mechanism may be brought about by the swiveling of the shift finger, whereby in this swiveling movement, at least one disengagement flank of the shift element loads at least one or more disengagement levers in such a manner that this lever or plurality of levers is swiveled, and in so doing acts in such a manner through one or a plurality of shift mechanisms so that it is assured that the gears that are assigned to these shift mechanisms are engaged, and especially before the new gear is engaged via the shift element. These disengagement levers are in particular all the disengagement levers that are provided for the operation of the transmission or the same partial transmission, except one that preferably is disposed in the associated position at the height of the shift finger and especially preferably swivels in the clearance space of the shift element.

It is especially preferably provided that exactly one input side component of the actuator device, such as a shifting shaft or shift element, may be loaded in such a way that it is set in motion whereby through this movement, different disengagement elements of the actuator device are made to move, and in particular in relation to one another. It may be provided in particular that via a movement, especially a constant movement—in particular a swiveling movement—of the shifting shaft and/or of the shift element, a disengagement element of the actuator device, especially a shift finger, will be moved in such as way as to act upon a shift mechanism of the transmission so that a gear will be engaged there, and whereby through this movement of the shift element and/or shifting shaft, it will further be effected that at least one additional disengagement element of the actuator device, which may be in particular a disengagement finger or disengagement lever, acts upon at least another shift mechanism of the actuator device in such a manner that it is assured that the gears that are assigned to this or these shift mechanisms may be disengaged or are disengaged, and especially before the one shift mechanism has accomplished the engagement of the target gear.

The transmission device or the transmission is preferably a parallel-shift transmission. Preferably, it may be assured via the transmission device according to this invention or the actuator device according to this invention that only a single gear of a transmission or a particular partial transmission of a parallel transmission may be engaged at any given time. The engaged gear can thereby be changed, and in particular preferably in any desired sequence. It may also be provided that gears can be changed in such a way that it is possible to shift into a desired gear of any other particular partial transmission.

For example, the shift mechanisms may each have a moveable coupling sleeve that may be moved for the engagement or disengagement of gears, and especially in order to produce or disengage a shaft/gear connection. It may be provided that the shift mechanisms each have a coupling sleeve and a shift rail or may be formed thereby. It may also be provided that the shift mechanisms each have a coupling sleeve and a shift fork or may be formed thereby. Such shift forks may, for example, be longitudinally displaceably mounted on a shaft. The shift forks or shift rails are preferably each directly coupled with a coupling sleeve. In a preferred embodiment, the shift forks or shift rails engage in the coupling sleeves in such a way that they can displace the coupling sleeves longitudinally to engage or disengage gears. The shift forks or shift rails are preferably longitudinally displaceable, especially preferably each is only longitudinally, whereby it may be provided that the directions in which the different ones of these may be moved are parallel. But in particular, the shift forks may also—especially alternately—be swiveled.

It may be provided that, via a plurality of and/or each of the shift mechanisms, exactly two gears of the transmission may be engaged. However, it may also be provided that one or more shift mechanisms are provided, through which just one gear may be engaged. Furthermore, it may be provided that the gear or gears assigned to the shift mechanism may be disengaged for each of the shift mechanisms.

Preferably, one gear of each gear set is disposed on a carrying shaft so that it can be swiveled, and may be rotationally fixedly joined to this shaft via a shift mechanism for the engagement of a gear that corresponds to this gear set, which may be accomplished, for example, by the displacement of a coupling sleeve. Preferably, the remaining gears of each gear set are disposed and firmly fastened to a shaft that carries them. Preferably, the transmission has an input shaft and an output shaft, the input shaft especially preferably carrying one gear of each gear set and the output shaft carrying one gear of each gear set. As long as the transmission has a plurality of parallel-shifted drive train branches or drive train branches that can be used as desired with torque connection to an internal combustion engine, and one partial transmission is disposed in each of these drive train branches, then the aforementioned is valid preferably for each of these drive train branches or partial transmissions. However, it may be provided that the input or output shafts of the two partial transmissions are identical. In an especially preferred embodiment, the output shafts of two such partial transmissions are identical, whereby the rotatably mounted gears of both partial transmissions, which may each be rotationally fixedly joined to their carrying shafts, may be carried by the output shaft. Preferably, the gear sets for the forward gears each have exactly two gears that engage in one another.

Furthermore, according to the invention, a use of the actuator device according to the invention is for the operation of a parallel transmission is proposed. A vehicle drive train is also proposed.

The vehicle drive train preferably also has a coupling device such as a starting clutch. This may be, for example, controlled electronically. As long as the transmission or the transmission device is a manual shift transmission or an automated-shift transmission, it is preferably provided that exactly one starting clutch is provided. In a parallel-shift transmission or a twin-clutch transmission, two starting clutches are in particular provided in the drive train. The starting clutches are preferably friction clutches.

In a preferred embodiment, the starting clutch or the starting clutches are controlled or operated by an electronic control device. Furthermore, it is preferred that the transmission devices or actuator processes of the transmission be controlled by an electronic control device. Furthermore, it is preferred that an engine control unit be provided for the internal combustion engine. The engine control unit and/or the clutch control device and/or the transmission control device can be in communication with each other. It may in particular be provided that signals from the engine control unit and/or from the transmission control device may be transmitted to the clutch control device, and operational processes of the clutch may be effected as a function of these signals. Correspondingly, the transmission actuation may be performed as a function of signals that are transmitted by the engine control unit and/or by the clutch control device of a transmission control device. Furthermore, it may be provided that the electronic transmission control device and the electronic clutch control device are designed as one control device.

A method according to the invention also is described.

Preferably, at least two more specific parameters of the shift pattern form a subset of the generally determined parameter, these more specific parameters to be ascertained after the calculation of the general parameter. It is to be preferred that the geometrical parameter which was generally determined in the first step be stored, and that the parameters that were calculated differently in the second step be stored. In addition, it is preferred that a general parameter is a gear position of a shift mechanism or a shift rail, to which a gear or two gears are assigned, and that the more specific parameter in addition identifies one of these two gears. In a preferred embodiment, the method for a transmission having two partial transmissions is provided, a general parameter being the expanded neutral region of the entire transmission, the first more specific parameter being the expanded neutral region of a partial transmission and a second more specific parameter being the expanded neutral region of the other partial transmission.

It may be provided that the prescribed parameters of the determined shift pattern are stored in such a way that they may be taken into account during the control by an electronic control device that controls the gear change processes of the transmission electronically. The electronic control of the shift element for determining the shift pattern may preferably also be accomplished via the electronic control device.

BRIEF DESCRIPTION OF THE DRAWINGS

In the following, exemplary embodiments of the invention will be explained in reference to the figures, by which the invention is not to be limited. Shown are.

DETAILED DESCRIPTION OF THE INVENTION

Figure 1:
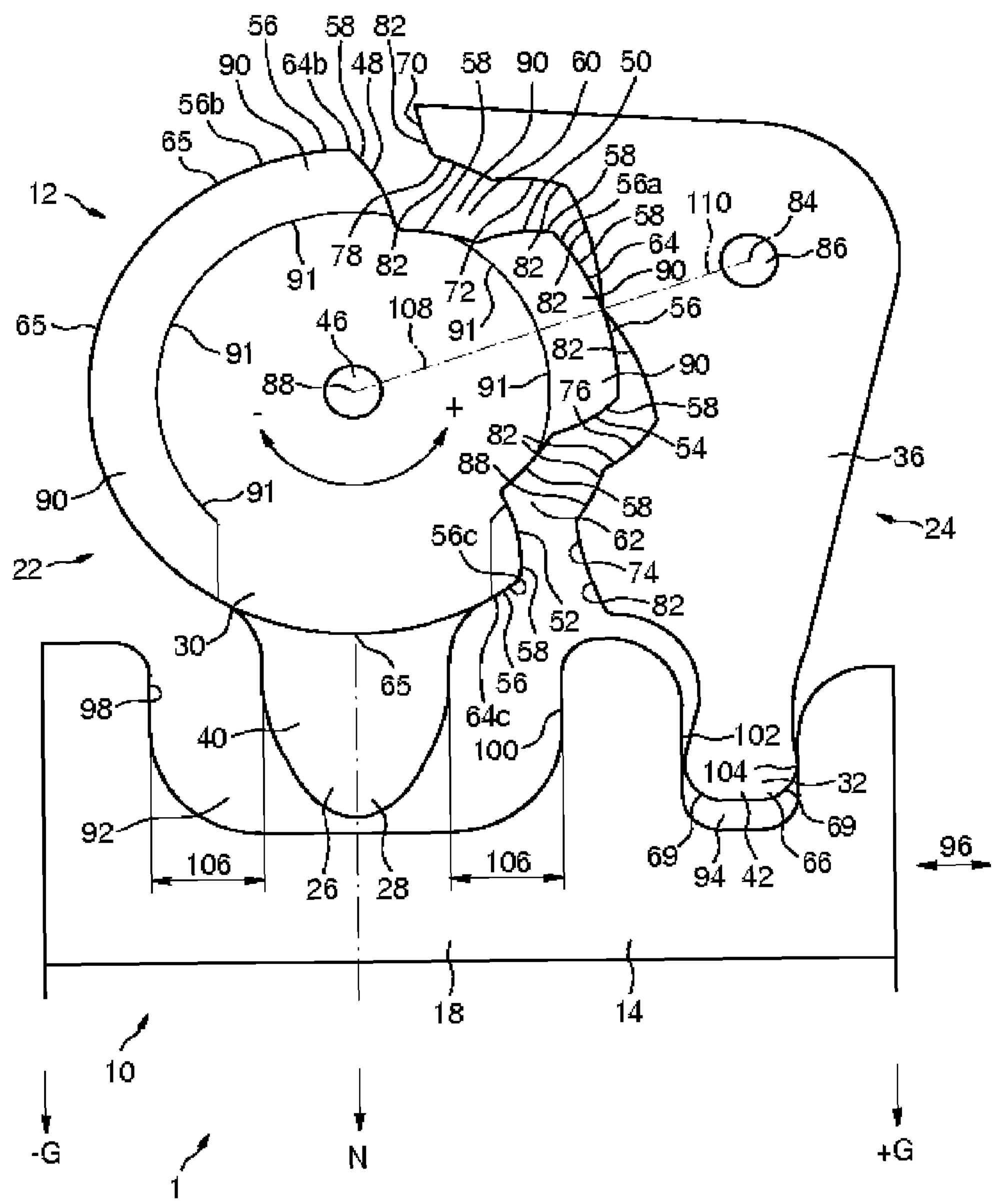
FIGS. 1 to 5 depict a first exemplary embodiment of a transmission device according to the invention in piecewise schematic representation with an exemplary actuator device according to the invention in different positions, likewise piecewise and schematically represented.

FIGS. 1 to 5 depict a first, exemplary embodiment of a transmission device according to the invention in a piecewise schematic representation. This transmission device is comprised of transmission 10 as well as actuator device 12 for the engagement and disengagement of gears in transmission 10.

Transmission 10, in particular a motor vehicle transmission, has at least two shafts (not shown), as well as a plurality (also not shown) of gear sets. Via these gear sets, different gear steps or gear ratios of the transmission may be achieved or engaged. In addition, the transmission has a plurality of shift mechanisms 14, 16, of which 14 in FIGS. 1 to 4, and two in FIG. 5 are depicted piecewise and schematically in an exemplary embodiment. Via shift mechanisms 14, 16, rotationally fixed shaft/gear connections may be produced or released as desired. For this purpose, the associated shift mechanism 14, 16 may be operated accordingly via actuator device 12.

Each shift mechanism 14, 16 has a shift rail 18, 20. This shift rail 18, 20 is always turned towards actuator device 12, and this actuator device 12 is able to operationally engage in each of the shift rails 18, 20. In place of shift rails 18, 20, shift forks, especially longitudinally displaceable ones, or the equivalent may also be provided. Insofar as such shift forks are not longitudinally displaceable but rather are able to swivel, their swivel axes may be positioned perpendicular to the focal plane as in the embodiment according to FIGS. 1 to 5.

Shift rails 18, 20 are each extensible along their lengths or axially. This direction of motion of shift rails 18, 20 is indicated schematically by double arrow 96. By moving shift rails 18, 20 in this direction, gears of transmission 10 may be engaged or disengaged. For example, shift rails 18, 20 may be fastened, especially fixedly, to coupling sleeves—which belong to each shift mechanism—through which rotationally fixed connections between a gear and a shaft may be produced and released. The direction of motion 96 of the shift rails is essentially perpendicular to swivel axis 88 of the shift element. In addition, direction of motion 96 of shift rails 18, 20 is essentially perpendicular to the swivel axis or axes of disengagement lever 36, 38 or disengagement fingers 66, 68.

Shift rail 18, 20 may be moved into (axial) positions or position regions, in which a gear of the transmission is caused to engage (gear positions) via this shift rail or the shift mechanism 14, 16 to which it belongs, as well as into an axial position or an axial position region, in which no gear is engaged in the transmission (neutral position) via each of these associated shift rails 18, 20 or the shift mechanism 14, 16 to which it belongs. Corresponding to each shift rail position, especially uniquely, is a position of shift mechanism 14, 16 to which it belongs, or a shift position of transmission 10. The aggregate of shift mechanisms 14, 16 may also be characterized as gearshift inner controls.

It may be provided that two gears may be shifted via each shift rail 18, 20 or that two gears are always assigned to these shift rails 18, 20 and the associated shift mechanisms 14, 16. It may also be provided that exactly one gear is assigned to such a shift rail as 18, 20 and the shift mechanism 14, 16 to which it belongs. Hybrid forms are also possible and especially with an uneven number of gears of the transmission or a partial transmission.

The position that is given in transmission 10 or the position of each shift mechanism 14, 16 or a particular shift rail will also be characterized as a "shift position".

In the figures, these types of positions are denoted by the symbols "+G", "−G" and "N". Two gears that may be shifted via each shift mechanism 14, 16 or each shift rail 18, 20 are denoted by "+G" or "−G". If shift rail 18, 20 is positioned in such a way that its left end is positioned at the height of the symbol "−G", then this indicates that gear "−G" is engaged in the transmission via shift rail 18, 20 (or shift mechanism 14, 16); correspondingly, gear "+G" is engaged in the transmission if the right end of the shift rail 18, 20 is positioned at the height of the symbol "+G". If shift rail 18, 20 is positioned in such a way that the symbol "N" (neutral") is essentially in the center of shift rail 18, 20, then there is no gear engaged in transmission 10 (neutral) by means of it or the corresponding shift mechanism. The gears permanently assigned to each of the symbols "+G" and "−G", such as first gear, second gear, etc. are a function of shift rail(s) 18, 20 or the gear sets with which the associated shift rail cooperates. The number of shift rails depends especially upon the number of gears of the transmission.

Shift rails 18, 20 are disposed essentially parallel to each other and next to each another. In the exemplary embodiments, shift rails 18, 20 each have, according to FIGS. 1 to 11, a first cutout 92 (shift mouthpiece) for the engagement of shift finger 28, as well as a second cutout 94 (disengagement mouthpiece) for the associated engagement of disengagement finger 66, 68. First cutout 92 is relatively wide compared to second cutout 94, and especially when seen in the direction of motion 96 of each shift rail 18, 20, so that the second cutout is comparatively narrow. These cutouts 92, 94 are depressions in shift rails 18, 20 that extend perpendicular to direction of motion 96 or in the direction of swivel axis 88 passing through each shift rail 18, 20.

First cutout 92 has straight or evenly formed flanks 98, 100, at right angles to direction of motion 96 of shift rails 18, 20. These flanks 98, 100 delimit first cutout 92 in the direction of motion direction 96 of shift rail 18, 20 or form a section of these borders.

Second cutout 94 has straight or evenly shaped flanks 102, 104 that are situated at right angles to direction of motion 96 of the shift rails. These flanks 102, 104 border second cutout 94 in the direction of motion 96 of shift rail 18, 20 or form cutouts of these borders.

63 The width of first cutout 92 is—when seen from direction of motion 96 of shift rail 18, 20—coordinated with the width of shift finger 28 in this direction, as well as the shift paths that are required for the engagement of a gear, in such a way that the shift finger may be moved for the engagement of a gear into a gear position and may cause a gear of the transmission to be engaged, and, then may be moved back into its neutral or central position without again disengaging the previously engaged gear. For example, if in FIG. 1, the shift finger is swiveled towards the right in order to shift gear "+G" there, after a certain idle stroke, shift finger 28 loads shift rail 18 via flank 100 in order to trigger the shifting into gear "+G". The width of first cutout 92 in this context should be such that the shift finger then may be moved back into the neutral position indicated in FIG. 1 without moving the shift rail out of its gear position by running up against opposing flank 98, and thereby effect the disengagement of the gear; this is correspondingly valid for the movement into gear "+G" and back. The width of first cutout 92 is determined from the width of shift finger 28 and shift path 106 or shift paths 106 for the "+G" shift and "−G" shift or "+G" shift direction or "−G" shift direction. The shift movements of shift finger 28 from its central position into its "+G" position are symmetric to those in the "−G" position. According to FIG. 1, it is provided that the part of the shift path that is an idle stroke of the shift finger essentially corresponds to the part of the shift path in which shift finger 28 moves shift rail 18, 20; strictly speaking then, the shift path corresponds to the sum of both paths 106 in FIG. 1. The idle stroke may also be larger than the part of the shift path in which shift finger 28 moves shift rail 18, 20 in gear during shifting.

Actuator device 12 may be used for various types of transmissions, or transmission device 1 may be of a different design. Transmission device 1 may therefore be, for example, a manual shift transmission or an electronically controlled transmission. It may be provided that transmission device 1 is formed in such a way that gears in transmission 10 may be shifted with an interruption in pulling power or in such a way that gears may be shifted essentially without an interruption in pulling power. For example, transmission device 1 may be an automated-shift transmission (ASG) or a twin-clutch transmission (DKG) or a parallel-shift transmission (PSG). The application in such parallel-shift transmissions is an especially preferred use of actuator device 12, just as the design of transmission device 1 or of transmission 10 as a parallel-shift transmission is an especially advantageous embodiment. In such parallel-shift transmissions or twin-clutch transmissions, in which the drive train or drive train branches may be brought into torque connection with the internal combustion engine of a vehicle independently from one another and a plurality of interrupt stages is disposed in these parallel branches, it may be provided, for example, that all the gears of both branches may be shifted via main actuator element 22 or shift finger 28, and/or shift element 30. The gears assigned to the branches may also be characterized as gear groups or form gear groups. In such a parallel-shift transmission or twin-clutch transmission, it is generally permissible or possible or desirable that there is simultaneously one gear position in each parallel-shifted branch of the drive train or one gear in each of the gear groups. It may even be a requirement that gears which are essentially free of pulling power interruption may be shifted. For example, this may occur in such a way that a disposed gear is engaged on a branch of the drive train and the accompanying starting clutch, especially a friction clutch, which produces the connection to the internal combustion engine, is engaged. In order to shift into another gear in a manner essentially free of pulling power interruption, the target gear may be engaged in the other partial transmission or the other parallel-shifted drive train branch, the starting clutch assigned to this gear group or this drive train branch, such as a friction clutch that can produce a torque connection to an internal combustion engine, being disengaged at first. The synchronized disengagement and engagement or engagement of the two starting clutches, each of which is assigned to one of the two drive train branches or partial transmissions, makes it possible to shift from the starting gear shifted in the one partial transmission into a target gear that is to be shifted in the other partial transmission, without there being a pulling power interruption or a considerable pulling power interruption.

Actuator device 12 has a main actuator device 22 as well as a secondary actuator device 24.

Main actuator device 22 has a shift element 30 or is formed from shift element 30. Shift element 30 has main actuator element 26 for shifting of a shift rail or shift rails that is shaped like a finger and is also referred to as a shift finger 28. In an especially favorable embodiment, shift finger 28 is designed as an involute shape. In addition, surface profiles 58 are provided on shift element 30. Shift element 30 is formed as a single piece and in particular with surface profiles 58 and shift finger 28. Shift element 30 is on the one hand axially movable as desired and, on the other hand, rotationally movable for shifting. During these movements, shift finger 28 as well as surface profiles 58 of shift element 30, are correspondingly moved along together.

In addition, shift element 30 has disengagement flanks 48, 50, 52, 54 for the operation of disengagement lever(s) 36, 38. In addition, shift element 30 has locking part 56 which has—as is indicated in the Figures—one or more (surface) sections 56*a*, 56*b*, 56*c* that are essentially cylindrical or in the shape of a cylinder sections, and which is also characterized as a locking cylinder. Disengagement flanks 48, 50, 52, 54 may be, as depicted in FIG. 1, components of the surface of shift element 30. In an advantageous embodiment, disengagement flanks 48, 52 or disengagement flanks 50, 54 are each designed as convex shapes. Locking part or locking cylinder 56 may also be—as depicted in FIG. 1—formed from one or more surface sections of shift element 30.

Disengagement flanks 48, 50, 52, 54 or locking cylinder 56 are components of a surface profile 58 of main actuator element 22 or of shift element 30. Surface profile 58 has surface depressions 60, 62 and surface elevations 64. In the example according to FIG. 1, this is such that a surface elevation 64 is formed between two surface depressions 60, 62. Disengagement flanks 48, 50 or disengagement flanks 42, 54 are components of the contour that forms surface depressions 60, 62. The locking part or locking cylinder 56 is a component of a contour that forms surface elevation 64 or a plurality of surface elevations 64, 64*b*, 64*c*. In the example according to FIG. 1, surface elevation 64 adjoins surface depression 60 on the one side, and surface depression 62 on the other. Surface elevation 64*b* adjoins—on the other side—surface depression 60 or surface depression 62 adjoins surface elevation 64*c*. Surface profile 58 extends along one of the surface sections extending around the swivel axis of shift element 30 extending in the circumferential direction.

Disengagement flank 48 is situated—in the circumferential direction with respect to the axis of rotation of shift element 30—opposite disengagement flank 50. In a corresponding way, disengagement flank 52 is situated opposite disengagement flank 54. Locking part or locking cylinder 56 or a section 56*a* of this locking part or locking cylinder 56 extends between disengagement flanks 50 and 54.

Figure 6:
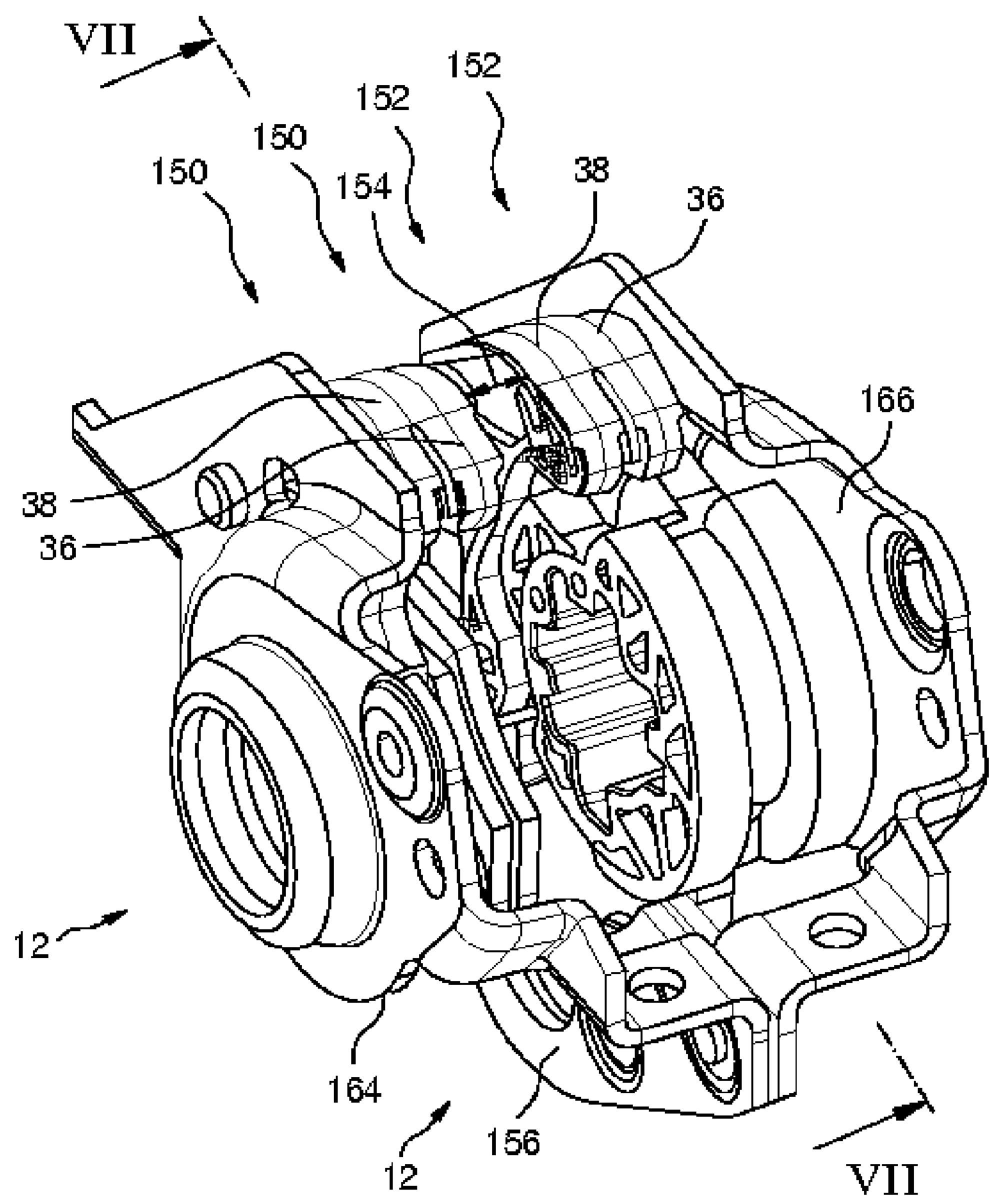
FIG. 6 shows an exemplary embodiment of an actuator device according to the invention for a parallel-shift transmission that may be combined in an advantageous embodiment with the embodiments according to FIGS. 1 to 5.

Shift element 30 may have a plurality of these types of surface profiles, as is also depicted, for example, in FIG. 6. Such surface profiles may—in the direction of axis 88 of shift element 30—be axially distanced from one another. Between disengagement flanks 48 and 52, the outer surface of shift element 30 may be formed, for example, cylindrically or in the form of a cylinder section as is schematically indicated by reference character 65 in FIG. 1; in this context, surface elevations 64*b*, 64*c* overlap with one another or are identical. It may be provided that the radius of cylindrical cutouts 56*a*, 56*b*, 56*c* is identical; the same radius may also be present in region 65.

In the plane as seen in the axial direction of shift element 30 in which shift finger 28 is disposed, shift element 30 forms one or a plurality of clearances 90. In the plane of shift finger 28, seen in the circumferential direction with respect to swivel axis 88, radial outer boundary 91 of shift element 30 is closer at least in sections to swivel axis 88 than in planes in which surface profiles 58 or disengagement flanks 48, 50, 52, 54 of the shift element are disposed. This may, for example—as shown in FIG. 1—be such that shift element 28 outside of the segment in which shift finger 28—in this case essentially radially—projects is limited in the plane of this shift finger of shift element 30 essentially by a cylindrical surface (see Line 91), which at least in sections is situated closer to the swivel axis 88 than areas of surface profile 58. For example, it may be provided that in the plane of shift finger 28, a groove is provided that forms clearance 90 and that at least in sections extends along the circumferential direction directed around swivel axis 88, as is depicted, for example, in FIGS. 6, 10, and 11.

Clearance 90 may also be used in such a way, as will still be explained in the following, that the disengagement lever to which the shift mechanism is assigned and with which the shift finger is currently cooperating, may be shifted in such a way that this disengagement lever does not attempt to move the associated shift mechanism into a neutral position. It may especially be the case that this disengagement lever may swivel further in the direction of shift element 30 than other disengagement levers of the same transmission or partial transmission.

Shift element 30, along with shift finger 28, is carried by a rotatably mounted or swivel-mounted and axially movable shifting shaft 46. Shift element 30 or shift finger 28 may be axially and rotationally fixedly joined to this shifting shaft 46 so that a swiveling of this shifting shaft 46 effects a swiveling of shift element 30 or of shift finger 28, and an axial displacement of shifting shaft 46 effects an axial displacement of shift element 30 or shift finger 28. Shifting shaft 46 and shift element 30 may be manufactured separately or in one piece. To produce the rotary or swiveling movement of the shift element or shifting shaft, on the one hand, and to produce the axial displacement, on the other hand, one electric motor for each may be provided, which can, for example, load or drive shifting shaft 46 accordingly.

Such electric motors may, for example, be linked by signal with an electronic control device and be driven by it. The electric control device is able to process and/or accommodate different signals, such as signals that indicate parameters of the internal combustion machine of a motor vehicle and/or speed signals of the motor vehicle, and/or positions of the selection lever of the motor vehicle and the like.

Secondary actuator device 24 has a plurality of disengagement elements that are movable and movable in relation to each other and are formed in this case as levers (disengagement lever 36, 38) or is formed by them. At each of these disengagement levers 36, 38 a secondary actuator element 32, 34, which is formed as a finger, is provided for each disengagement finger 66, 68, so that these disengagement fingers 66, 68 are mounted in such a way as to be movable and movable in relation to each other. Moreover, each of disengagement levers 36, 38 has a surface profile 82. Each of these disengagement levers 36, 38 is formed as one piece, and in particular together with each disengagement finger 66, 68 and each surface profile 82.

Disengagement levers 36, 38 are each rotatably mounted or swivel-mounted about a swivel axis 84. It may be provided that the same swivel axis 84 is assigned to all disengagement levers 36, 38, as is essentially the case in the design according to FIGS. 1 to 11. In this context it may further be provided that all disengagement levers 36, 38 are mounted on a common shaft 86 for holding disengagement levers 36, 38 to achieve this swiveling. However, in this context it is provided that the different disengagement levers 36, 38 are disposed in such a manner that they swivel in relation to each other. It may be provided that shaft 86 is fixedly mounted, that is, not able to swivel, and disengagement levers 36, 38 are each held on this shaft in such a manner that they swivel. Furthermore, it may be provided that suitable bearing means, such as ball bearings or the like, may be disposed between each disengagement lever and shaft 86. However, it may also be provided that different disengagement levers 36, 38 are mounted on different shafts, which in some cases are even mounted so as to swivel in relation to each other. Furthermore, it may be provided that—insofar as different partial transmissions are present—a separate shaft 86 is provided for each partial transmission that holds all disengagement levers 36, 38 of the partial transmission in question. However, the disengagement levers 36, 38 of different partial transmissions may also be carried by a common shaft. It may also be provided, as is shown by way of example in FIGS. 12 to 14, that different disengagement levers 36, 38 are mounted swiveling about different swivel axes.

Swivel axes 86 of disengagement levers 36, 38 are aligned parallel to each other in an advantageous design. It is especially advantageously provided that swivel axes 86 of the disengagement levers are offset from—and in particular parallel to—swivel axis 88, around which shift element 30 of shift finger 28 swivels.

One disengagement lever 36, 38 is provided for each shift rail 18, 20 or for each shift mechanism 14, 16. These disengagement levers are disposed adjacent to each other and in this context are situated in particular parallel, offset planes.

As FIG. 1 shows, surface profiles 82 of disengagement levers 36, 38—in the following, the disengagement lever is spoken of for the sake of simplification—are formed of surface elevations and depressions.

The disengagement levers are each identically formed. Surface profile 82 of the disengagement lever is disposed on the side of disengagement lever 36, 38 that faces shift element 30, and surface profile 58 of the shift element is disposed in particular on the side of the shift element facing the disengagement levers. This relates in particular to such profile sections of the shift element or disengagement lever, which, as will be explained, are able to cooperate.

Disengagement lever 36, 38 has disengagement flanks 70, 72, 74, 76. Furthermore, disengagement lever 36, 38 has one or more locking flanks 78, 80. Disengagement flanks 70, 72, 74, 76 or locking flanks 78, 80 are a component of a surface profile 82 of disengagement lever 36, 38.

The disengagement fingers may be designed in an advantageous embodiment, as is shown in FIG. 1, with radial contact surfaces 69 or have convex curved surface sections. Each disengagement finger 66, 68 may essentially be disposed in the second cutout of a shift rail 16, 18 in such a manner that, in orientations of the direction of motion 96 of shift rail 18, 20, they essentially rest against them or there is a small space or slight play between them. In this context, a disengagement finger is positioned in each of the two cutouts 94 of a shift rail 16, 18, and especially so that it can load the straight or flat flanks 102, 104 of the second cutout 94 with its radial contact surfaces 69.

Actuator device 12 has a plurality of output elements 40, 42, 44 that differ from each other and can be moved for operative engagement in the shift mechanisms of the transmission. This is especially so that output elements 40, 42, 44 engage in shift rails 18, 20. In the embodiment according to FIGS. 1 to 5, a particular secondary actuator element 32, 34 engages at the time in a shift rail.

Figure 12:
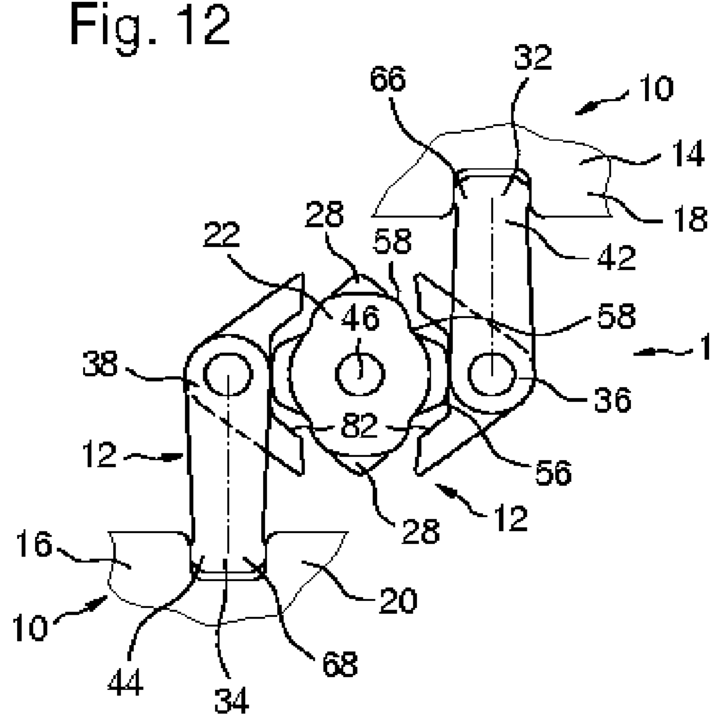
Figure 13:
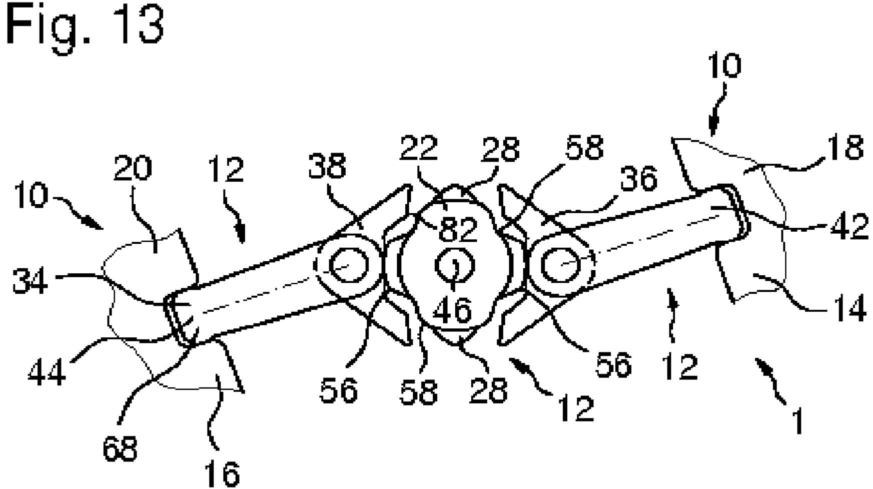
Figure 14:
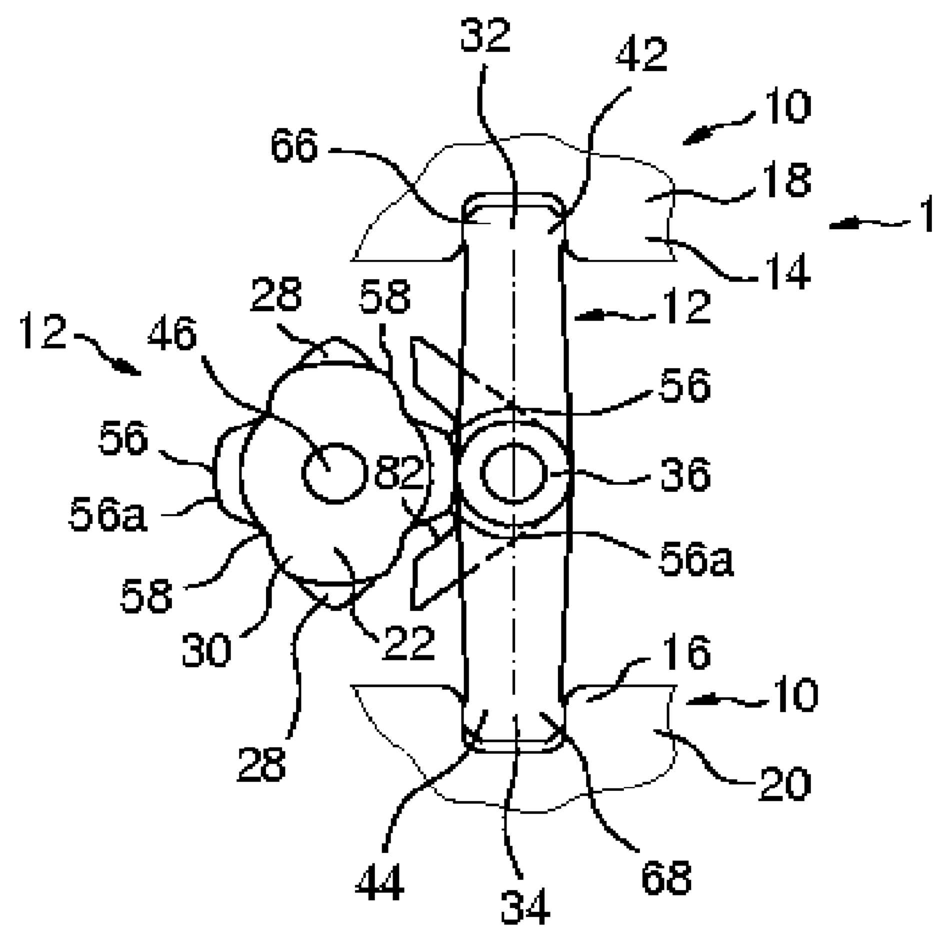

In the exemplary embodiment according to FIGS. 1 to 5, output elements are formed by secondary actuator elements and by the main actuator element or by disengagement fingers 32, 34 and shift finger 28. Thus, it may be provided, for example, that one (40) of output elements 40, 42, 44 is formed by shift finger 28 and remaining output elements 42, 44 by disengagement fingers 32, 34 (see FIGS. 1 to 5). In this context, it may be provided in particular that disengagement finger 32 or 34 of disengagement lever 36 or 38 are permanently engaged with shift rails 18, 20 or a particular shift rail 18 or 20. Examples in which the shift finger(s) do not form any output elements and each disengagement finger forms a disengagement element or each output element is a disengagement finger are shown in FIGS. 12 to 14.

In a design in which transmission device 1 is formed as a twin-clutch transmission or a parallel-shift transmission, it may be provided that separate secondary actuator devices are provided for the partial transmissions. For example, it may be provided that each of the partial transmissions has a secondary actuation device with disengagement elements or disengagement levers 2. It may also be provided in this case that each of these disengagement levers 36, 38 cooperates or is able to cooperate with a shift mechanism 14, 16 to which it is assigned. In particular, it may be provided in this case that each of the disengagement elements has a secondary actuator element, especially a disengagement finger 32, that cooperate with a shift mechanism 14, 16 of transmission 10 that is assigned to it. For example, such a disengagement finger 32, 34, may be permanently engaged with a shift rail 18, 20.

It may be provided that the disengagement elements or disengagement levers 36, 38 that are assigned to the same partial transmission, are disposed with little spacing or little play between each other and the disengagement levers of the other partial transmission accordingly are adjacent to each other, the disengagement levers of the different partial transmissions that face each other having a greater spacing.

It may be provided that, in transmissions such as an automated-shift transmission (ASG) or a manual shift transmission, all disengagement elements or disengagement levers 36, 38 are arranged with less spacing.

The main actuation element 26 or shift finger 28 may be moved for the shift and for the select. In the exemplary embodiments, this is such that the shift finger may essentially be moved in an axial direction (translatory) or in the direction of shifting shaft 46, and may be swiveled about a longitudinal axis that extends in this axial direction. This may be achieved especially by means of shifting shaft 46 or by the shifting shaft loading shift element 30 or shift finger 28 accordingly.

The main actuator element or shift finger 28 may therefore be moved essentially in accordance with a shift-select gate arrangement or in accordance with a part of such. Such an arrangement may be formed, for example, in the manner of an H shift pattern. However, this does not mean that the shift finger must therefore inevitably carry out corresponding linear movements. Therefore, the embodiment according to FIGS. 1 to 5—as mentioned—shows an example of how the movement in the shift gate direction may be achieved by a swiveling of shift finger 28, and the movement in the select gate direction by an axial displacement. The arrangement of the gear in such a shift-gate/select-gate arrangement may be configured in a different manner. It may also be provided according to the invention that the next higher gear in particular is assigned to a shift gate of a different partial transmission, as may be the case, for example, in twin-clutch transmission or parallel-shift transmissions. It may also be the case that the even gears are assigned to the shift gates of one partial transmission, and the odd gears are assigned to the shift gates of another partial transmission. It may also be provided that one or more or all gears are provided in each case in different partial transmissions, that is, repeatedly when considered as a whole.

Main actuator element 26 or shift finger 28 can be moved, in order to move an output element 42 or 44 to shift a shift rail 18, 20 or for the engagement of gears of the transmission. This output element 42 or 44, which is movable by shift finger 28, is, according to the designs of FIGS. 1 to 11, shift finger 28 itself and in the designs of FIGS. 12 to 14 is a secondary actuation element and in particular such a one as is not involved at the time in the disengagement or locking of gears (other shift gates).

By moving shift finger 28 in the shift direction (swiveling), shift finger 28 can be made to operatively engage with a shift rail 18, 20, which essentially corresponds to the particular select position, or with shift mechanism 14, 16, to which this shift rail 18, 20 is assigned, in such a manner that a corresponding gear in transmission 10 is engaged via this shift mechanism 14, 16 or this shift rail 18, 20; in so doing shift rail 18, 20 is displaced accordingly.

By a select movement (in this case axial displacement) of shift finger 28, it can be positioned in such a manner that the engagement of a gear from the corresponding position can then be brought about via movement in the shift direction, in particular swiveling of the shift finger. Therefore, in particular the shift mechanism 14, 16 or shift rail 18, 20 with which shift finger 28 may be operatively engaged in a subsequent shift movement for shifting a gear is selected in the select operation. Shift finger 28 is able to operatively engage with a particular shift mechanism 14, 16 or shift rail 18, 20 via which different, especially two gears of transmission 10 may be engaged for the shifting or engagement of the particular one of these two gears in that it is moved from a neutral position in the one orientation of the shift direction; and by a movement going from a neutral position of shift finger 28 in the opposite orientation of the shift direction, the shift finger is able to operatively engage with this shift rail 18, 20 or this shift mechanism 14, 16 in such a manner that the other gear of transmission 10, which is assigned to this shift mechanism 14, 16 or this shift rail 18, 20, is engaged in the transmission. However, it is provided in this context that shift finger 28 must be moved in a prescribed range in both of these orientations so that the shifting of a gear in the transmission is also released.

In designs having two partial transmissions, e.g., twin-clutch or parallel-shift transmissions, it may be provided that shift finger 28 or shift element 30 can be displaced in the select or axial direction in such a manner that it—especially as desired—can act on all shift mechanisms of both partial transmissions for the engagement of gears, it being provided in particular that corresponding shift rails 18, 20 of the two partial transmissions are positioned accordingly. It may therefore be provided in particular that exactly one shift finger 28 and/or exactly one shift element 30 is provided for shifting the gears of both partial transmissions. A shift element may also have a plurality of shift fingers, as shown in the examples according to FIGS. 12 to 14.

In the exemplary embodiments according to FIGS. 1 to 11, it is provided that shift finger 28 for shifting a gear of transmission 10 directly loads a corresponding shift mechanism 14, 16 or a corresponding shift rail 18, 20; it is therefore an output element. This is, as may be inferred from the design according to FIG. 1, so that the shift finger, which is shown in FIG. 1 in a neutral position, via a swiveling in one or the other orientation comes into contact with a shift rail 18, 20 or a shift mechanism 14, 16 after a certain amount of swiveling and when swiveled further carries along or presses this shift rail 18, 20 or shift mechanism 14, 16 in order to move into a gear position. However, it may also be provided that the shift finger, for shifting a gear only indirectly, loads associated shift rail 18, 20 or associated shift mechanism 14, 16, as is shown, for example, in the exemplary embodiments according to FIGS. 12 to 14. Furthermore, it may be provided that such cooperation occurs in a contactless manner, which may be achieved, for example, via an electric or electromechanical cooperation.

The positions of shift finger 28 in the shift direction are also characterized as actuation positions. The (limit) positions that the shift finger must run against in order for a particular shift mechanism 14, 16 or shift rail to be moved or pressed by means of the shift finger into a gear position or a shift position "+G" or "−G" are characterized as actuation positions "+G" or "−G", and a center position is characterized as a neutral position or "N" or "Neutral". The actuation positions at which the shift finger is deflected (swiveled) out of "Neutral" and upon further swiveling (first) the associated shift rail is moved via the shift finger are designated as "+N" or "+Neutral" or "−Neutral". This is attributable to the fact that shift finger 28 has an idle stroke or in first cutout 92 of the particular shift rail can be moved in its longitudinal direction without loading it.

It is therefore made possible that different shift rails are driven or loaded by means of shift finger 28 for the shifting of gears. The shift finger is used in particular so that gears of the transmission may be engaged by means of this shift finger 28. However, the shift finger is not connected to the shift rails or shift mechanisms in such a manner that the gear last engaged via this shift finger is (inevitably) engaged if the shift finger is moved back into its neutral position. Therefore, it is not provided that the positions of the shift rails or shift mechanisms may be uniquely determined from each shift finger position.

Shift finger 28 may be moved relative to shift rails 18, 20 or shift mechanisms 14, 16 in such a manner that shift finger 28 is in a neutral position if one of shift rails 18, 20 or shift mechanisms 14, 16 is in a gear position. If the shift finger is in a gear position, it can be moved back out of it into its neutral position without the gear, which was previously engaged by means of the shift finger, in the process being disengaged again. Therefore, it is made possible that, unlike classical designs in which after the engagement of a gear first the disengagement of this gear, then the selection and thereafter the engagement of a new gear occurs, the selection of a new gear may occur without the previously engaged gear being disengaged.

When shifting into gears, the shift finger loads associated shift rail 18 or 20, preferably only via straight or flat flanks 98, 100. Each particular disengagement finger 66, 68 loads the particular shift rail in the disengagement of gears, preferably only via the straight or flat flanks 102, 104. If a shift rail 18, 20 carries along a disengagement finger 66, 68, this shift rail 18, 20 carries along this disengagement finger 66, 68, preferably only via the straight flanks 102, 104 of this shift rail 18, 20.

In the position shown in FIG. 1, the shift position is "neutral" and the actuation position is "neutral". Shift finger 28 is therefore in a neutral position and no gear of the transmission is engaged via shift rail 18 or shift mechanism 14.

For prescribed movements of the shift element or the shift finger in the shift direction for engagement of a gear, shift element 30 and secondary actuator device 24 or one or more of disengagement levers 36, 38 cooperate in such a manner that it is ensured that disengagement fingers 66, 68, which act within the same transmission or partial transmission as the shift fingers, though in the other shift gates of this transmission or partial transmission, each of them was or is positioned in a positioning area in which it is ensured that the particular assigned (other) output elements, which are in particular disengagement fingers, are positioned in a position region for the disengagement and/or locking of gears. The movements of the shift element 30 are in particular those through which shift element 30 or shift finger 28 is brought into a position in which the shifting into a gear is brought about, or so that the shift finger is moved within a position region in which a gear is engaged via the shift mechanism on which shift finger 28 acts in this context. In this context, the position or position region of a particular disengagement finger 66, 68 for the disengagement of a gear is such that shift mechanisms 14, 16 are reliably positioned via the engagement of the associated output element 42, 44 or disengagement finger 28 in these assigned shift mechanisms 14, 16 of the transmission or partial transmission in such a manner—if they are not ready for it—that no gear in the transmission is engaged via the particular shift mechanism 14, 16 or the particular gears assigned to the associated shift mechanism 14, 16 are locked, and in particular before the target gear is engaged by the swiveling of shift finger 28. It is ensured that then, if this associated gear is engaged in the transmission or partial transmission, the other gears of the transmission or of the same partial transmission are disengaged so that only one gear of the transmission or partial transmission may be engaged at a time.

In the exemplary embodiments according to FIGS. 1 to 11, this at least one other output element is a disengagement finger 66, 68 that engages in a shift rail 18, 20, which is differentiated from the shift rail in which the shift finger engages at this time.

Main actuator device or shift element 30 and secondary actuator device 24 or disengagement lever 36, 38 cooperate in such a manner that it is possible to produce controlled relative movements of the output element. The relative movements are in particular controlled by means of surface profiles 58, 82 of shift element 30 and disengagement levers 36, 38. These are in particular such that, in a movement of shift finger 28 into a gear position, an output element, which may also be the shift finger, is moved into a gear position, whereby the output elements of the same transmission or partial transmission that are assigned to other shift gates or act there at the time—if they are not already in such a position—are each moved into a prescribed position or a prescribed position region, which is such that via the assigned shift mechanisms no gear is engaged in the transmission or a gear that might be shifted is disengaged and especially before shift finger 28 has reached its gear position.

It is provided in particular that one or more surface profiles 58 of main actuator device or shift element 30 cooperate with one or more surface profiles of the secondary actuation device or the disengagement lever in such a manner that when the shift finger is moved for shifting of a gear it is ensured that all gears that are assigned to other shift gates of the same transmission or partial transmission are disengaged before the particular target gear is engaged by means of the shift finger.

The control is accomplished in particular via those surface profiles 58, 82 or via the cooperation thereof. It may be provided in particular that, in a swivel movement of shift finger 28 out of a neutral position into a gear position, one or more surface profiles 58 of shift element 30 operatively engage with surface profiles 82 of disengagement levers that are assigned to the same transmission or partial transmission in which shift finger 28 is operating at the time and which operate at the time in shift gates other than that of the shift finger. This cooperation may in particular be such that by movement of shift finger or shift element 30, the surface profile(s) of the shift element are moved in such a manner that they—especially via engagement in surface profiles of the associated disengagement lever—force these disengagement levers 36, 38 or their disengagement fingers into a position that is a disengagement and/or locking position. In this context, the disengagement fingers are or preferably act as output elements; however, it may be provided that they are coupled with output elements. Output elements 42, 44, in an engagement in shift rails in their disengagement and/or locking position that is preferably permanent, ensure that gears of the transmission assigned to the associated shift rails 18, 20 are disengaged. In this context, the control is in particular such that by moving the shift element 30 for the engagement of a gear, on the one hand, the shift element causes a movement of shift finger 28 or an output element loaded thereby for the engagement of a gear, and, on the other hand, via surface profiles 58, 82 act on disengagement levers 36, 38 or fingers 66, 68 or output elements 42, 44 that operate at the time in other shift gates of the same transmission or partial transmission as shift finger 28 in such a manner that these disengagement fingers or output elements are positioned in a disengagement and/or locking position. In this context it is provided that only the shifting shaft or the shift element has to be loaded (from outside) or driven in order to effect the relative movement of the output elements.

It may be provided that, in transmission 10, for example, retaining mechanisms, such as latches or the like are provided for the particular gears and prevent a gear from jumping out if the corresponding shift mechanism is unloaded from the shift finger or prevent the risk of it jumping out. The retaining force of such a retaining mechanism may in particular be such that, on the one hand, it is suited for vibrations or the like possibly occurring during operation, that is, it offers a sufficient retaining force, and, on the other hand, makes it possible that, by means of the secondary actuator device or a disengagement lever or a disengagement finger, the gear may be disengaged in a relatively simple manner without jamming or the like. If the shift finger, especially after a select operation, operates in another shift gate in order to engage a gear assigned to this shift gate, the previously selected gear may in turn be disengaged by means of the secondary actuation device or a disengagement lever or a disengagement finger during the movement of the shift finger in the shift gate direction via the cooperation of main and secondary actuator device.

Figure 2:
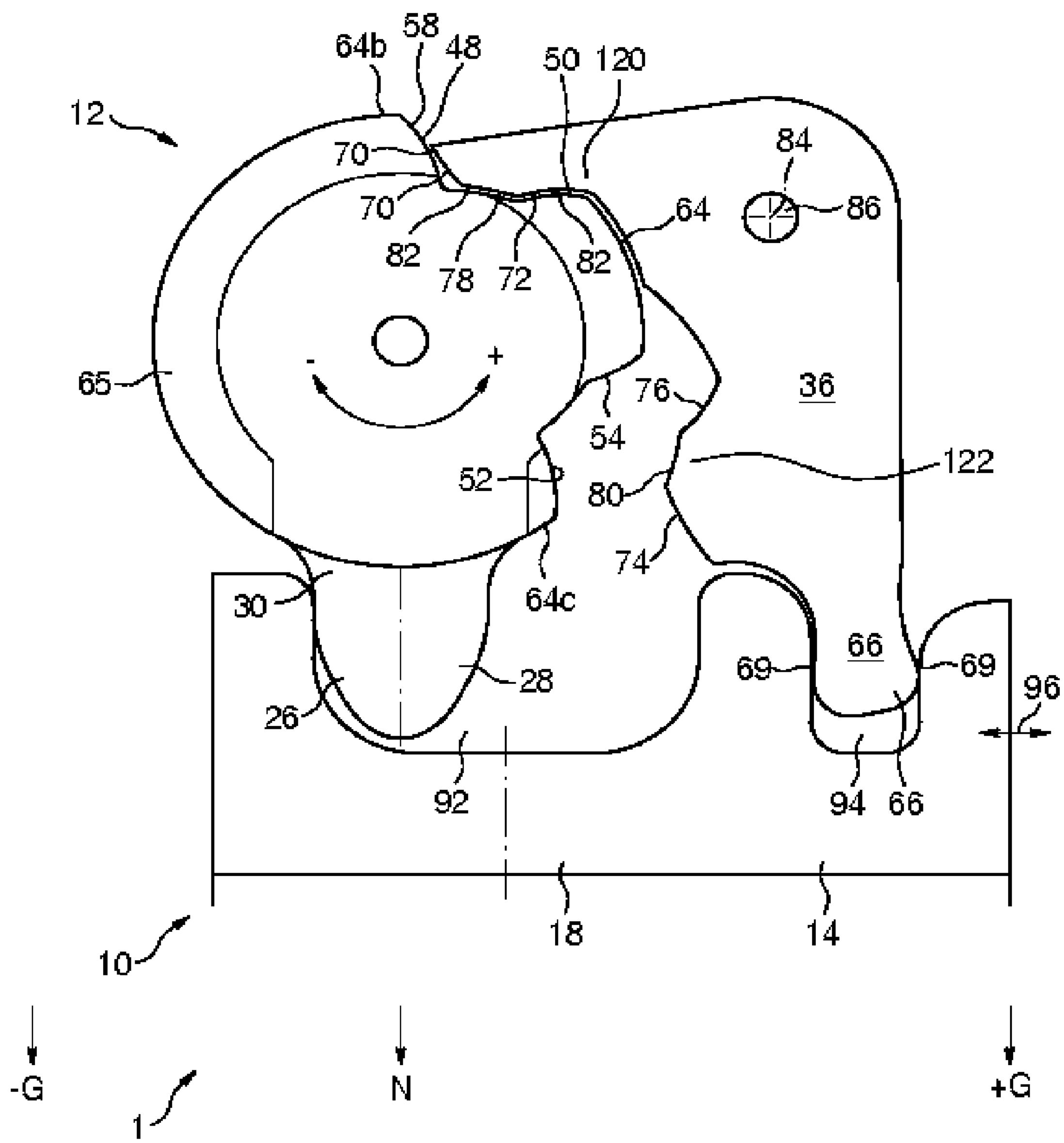

One output element in the exemplary embodiments according to FIGS. 1 to 11 is the shift finger; remaining output elements are each formed in the exemplary examples according to FIGS. 1 to 11 by a disengagement finger 66, 68. FIGS. 12 to 14 show exemplary embodiments in which all output elements are formed by disengagement fingers. According to the exemplary embodiment, the main actuator element and the secondary actuator element, or the main actuator device and the secondary actuator device are independent of the shift rails with regard to tolerances. The geometries that enable the "active interlock" functionality are essentially independent of the transmission or the shift rails with regard to tolerances. In FIG. 2 of DE 102 06 561 A1 an embodiment is shown in which the "active interlock" functionality cannot be transferred in such a tolerance-insensitive manner to the interior gearshift controls or shift mechanisms, as in the exemplary embodiments of the invention. In the design according to FIG. 2 of DE 102 06 561 A1, the geometries that are responsible for the disengagement and locking function are strongly subject to the tolerance influence of the transmission. If, specifically in this known design, the shift rails are installed offset in relation to each other—in particular above or below—in a tolerance-dependent manner, there exists the considerable danger of a jam. The danger of such an offset arrangement is not small, because in the assembly of the transmission to which the shift rails belong, tolerances add up under unfavorable circumstances.

The main actuator device 22 or the main actuator element 26 or shift finger 28 is able to be in operative engagement with a shift rail 18, 20 or a shift mechanism 14, 16 in such a manner that a corresponding gear assigned to this shift mechanism 14, 16 or this shift rail 16, 18 may be engaged or is engaged, whereby disengagement geometries or disengagement mechanisms or disengagement levers or the like operate or can operate in different shift gates in order to disengage gears that might be engaged there and/or to form an active gear lock for the gears that are assigned to these other shift gates. In this context, the sequence of the shiftable gears is not set to a specified sequence, that is, especially to a prescribed sequence that must be adhered to when upshifting and a prescribed sequence that must be adhered to when downshifting if the transmission or partial transmission has three or four or more gears, which preferably is the case. In relation to the same transmission or, if a twin-clutch or parallel-shift transmission or the like is present, in relation to the same partial transmission, disengagement geometries or disengagement elements or secondary actuator devices operate in all shift gates in which the shift finger is not positioned or not active for the shifting or engagement of a gear or for the displacement of a shift rail in order to disengage or actively block any gears shifted there. It is provided in particular that surface profile 58 of the shift element and those of the secondary actuation device or the disengagement lever form such disengagement geometries or are components of such. It is therefore preferably provided that the disengagement of gears and the engagement of gears are each implemented via separate components that nevertheless cooperate, and particularly with respect to different shift gates. It may also be provided that it is possible to shift out of a gear that is shifted via this shift rail into another gear that is shifted via this shift rail by means of shift finger 28, the engagement of the new gear moving the corresponding shift mechanism in such a manner that the old gear is disengaged during the movement for the engagement. Advantageously, it is provided that in one position, from which it is possible to shift into a gear via a pure shift movement, a gear assigned to another shift gate may be engaged which is disengaged by means of disengagement geometries or disengagement elements via a corresponding operative engagement if, in a pure shift movement, there is a shift into the new gear, whereby it is guaranteed that the old gear is disengaged before the new gear is engaged. The implementation, which enables functionalities of this type and in some cases also the advantageous functionalities, is characterized within the context of this disclosure as an "active interlock". An "active interlock" basic functionality is that an old gear must be completely disengaged before a new gear is allowed to be engaged. In designs having different partial transmissions, such as in a parallel-shift transmission or twin-clutch transmission, this relates to the particular partial transmission.

Actuation device 12, which may also be characterized as an "active interlock" core module (A1 core module), has shift element 30 as a functional element, which via rotation transfers or is able to transfer the "active interlock" functionality to the disengagement lever 36, 38 or a plurality of disengagement levers or all of the disengagement levers. Disengagement lever(s) 36, 38 are permanently engaged with each of the shift rails 18, 20 or the shift mechanisms 14, 16. Shift rails 18, 20 or shift mechanisms 14, 16 are a component of a particular partial transmission or of the transmission or of gearshift inner controls.

The mode of operation of a parallel-shift transmission requires that within a partial transmission only one gear (G) is permitted to be shifted. In transmissions having other gear ratios in which there are non-parallel drive train sections, the requirement may even be such that only one gear of the (entire) transmission may be shifted at a time. In the exemplary embodiments according to FIGS. 1 to 11—and this may also be the case for the exemplary embodiments according to FIGS. 12 to 14—disengagement flanks 48, 50, 52, 54 of shift element 30 are therefore located in or on a plane other than that of shift finger 28. It is provided in particular that surface profile 58—or, if a plurality of surface profiles 58 are provided (see FIG. 6) each of the surface profiles (58)—is arranged in one plane that is offset in the axial direction with respect to the plane in which shift finger 28 is arranged. The axial direction is determined, for example, by swivel axis 88. It may be provided that the distance of a plane in which disengagement flanks 70, 72, 74, 76 are arranged from the plane in which shift finger 28 is arranged essentially corresponds to the spacing of two shift rails 18, 20 of transmission 10 or of the same partial transmission, which may also be the case in a design according to FIGS. 6 and 7 or 10 or 11. In this way it is possible for shift mechanisms 14, 16 or shift rails 18, 20 to be acted on by means of surface profiles 58 or by means of disengagement flanks 48, 50, 52, 54 for the disengagement or locking of gears that are assigned to the same transmission 10 or partial transmission 10 as a shift mechanism 14, 16 or a shift rail 18, 20 with which the shift finger for the engagement of a gear is operatively engaged. However, this may also be achieved via other geometries or in another way. It may also be provided that surface profile 58 or disengagement flanks 48, 50, 52, 54 of shift element 30 extend in the axial direction to the extent that they can each cooperate with exactly one disengagement lever at a time. However, it may also be provided that they are dimensioned in the axial direction such that they are able to cooperate with a plurality of disengagement levers, which is explained in further detail below.

It is provided in particular that shift element 30 transfers the "active interlock" functionality via its swivel movement or rotation to a prescribed disengagement lever or the disengagement lever or a plurality of disengagement levers.

The cooperation of the surface profiles 58, 82, by which it is ensured that all other gears of the transmission 10 or—in the case of parallel-shift transmissions or twin-clutch transmissions—of the same partial transmission are disengaged before the new gear is engaged by means of shift finger 28, is further clarified or explained in particular in reference to the following figures.

FIG. 2 shows the design according to FIG. 1 in another position. According to FIG. 2, shifting rail 18 or shifting mechanism 14 is shifted in a shift position "+G" so that the transmission gear assigned to shift position "+G" of shift rail 18 is engaged. The actuation position in the position according to FIG. 2 is "neutral" and, thus, corresponds to the position that is also shown in FIG. 1. Shift element 30 or shift finger 28 is therefore in its neutral position. The disengagement lever or a section 120 of disengagement lever 36 is or was swiveled toward shift element 30 by shift rail 18, which is shifted out of "neutral". In this process, section 120 of disengagement lever 36 was swiveled toward shift element 30 on whose surface a part of surface profile 82 of disengagement lever 36 is disposed to which are assigned disengagement flank 70, disengagement flank 72 and locking flank 78 of disengagement lever 36. With respect to the neutral position of shift element 30, as the comparison of FIGS. 1 and 2 shows, disengagement finger 66 of disengagement lever 36 was swiveled in this case away from shift element 30. This position or swivel position of disengagement lever 36 was brought about by the disengagement lever being carried along by shift rail 18 in the movement or actuation of this shift rail 18 into a "+G" gear position. This entrainment has occurred in such a manner that disengagement finger 66 was carried along by shift rail 18 by means of the engagement of this disengagement finger into disengagement mouthpiece 94 and in so doing has effected a swiveling of disengagement finger 36 about swivel axis 84. The movement of shift rail 14 from the neutral position shown in FIG. 1 into the gear position "+G" shown in FIG. 2 was effected—not shown in FIG. 2—by means of shift finger 28. In this context, the shift finger was moved from the neutral position shown in FIG. 1 (actuation position "neutral") in the shift direction into the gear position of shift finger 28 shown in FIG. 4. In this context, shift finger 28 after getting past the idle stroke has loaded flank 100 in such a manner that it was moved in its direction of motion 96 into a "+G" gear setting and has swiveled the disengagement lever in the aforementioned manner via the aforementioned engagement with disengagement finger 66.

In this movement, shift finger 28 has cooperated with disengagement finger 66 or disengagement lever 36 with the same shift rail 18. However, in this context this disengagement finger 66 does not act to effect a neutral position of a shift mechanism; rather, it is deflected outward corresponding to a gear position.

Figure 3:
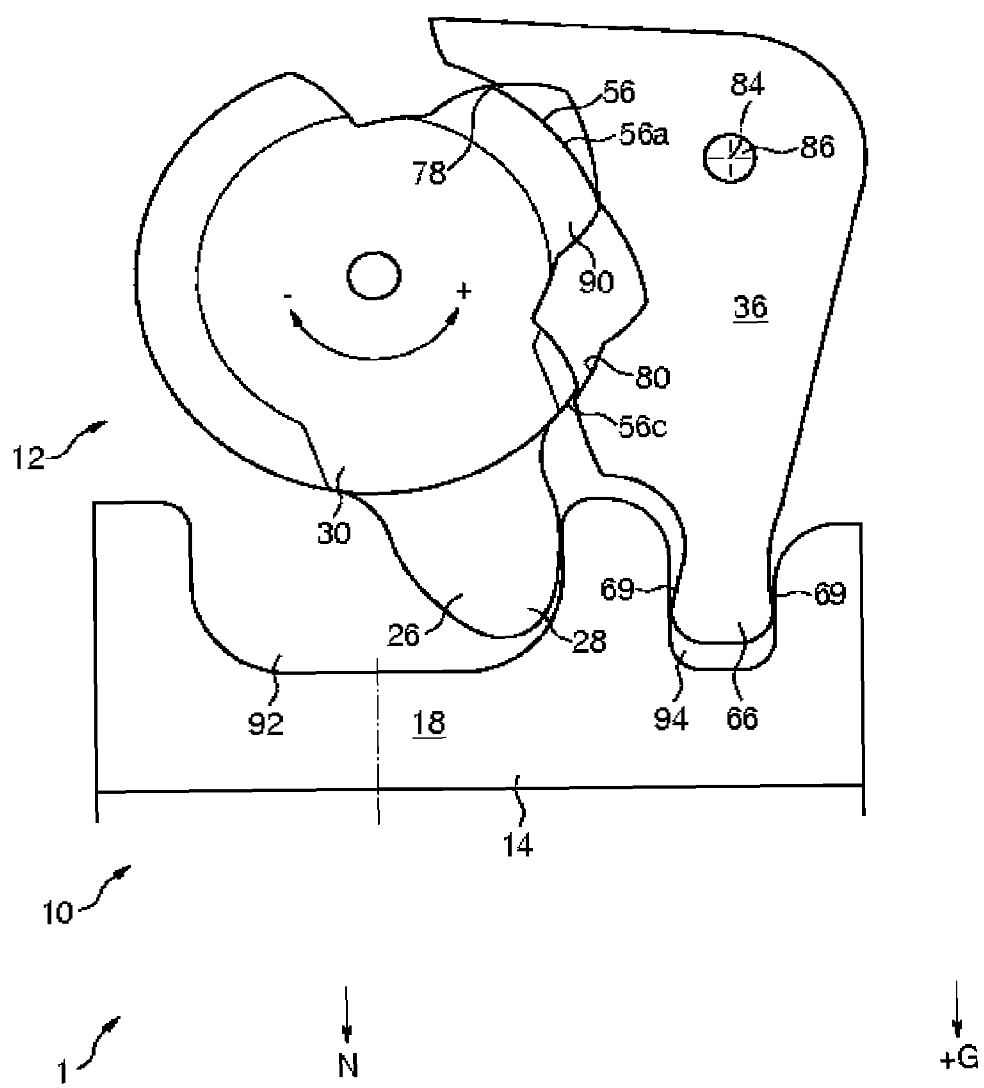
Figure 4:
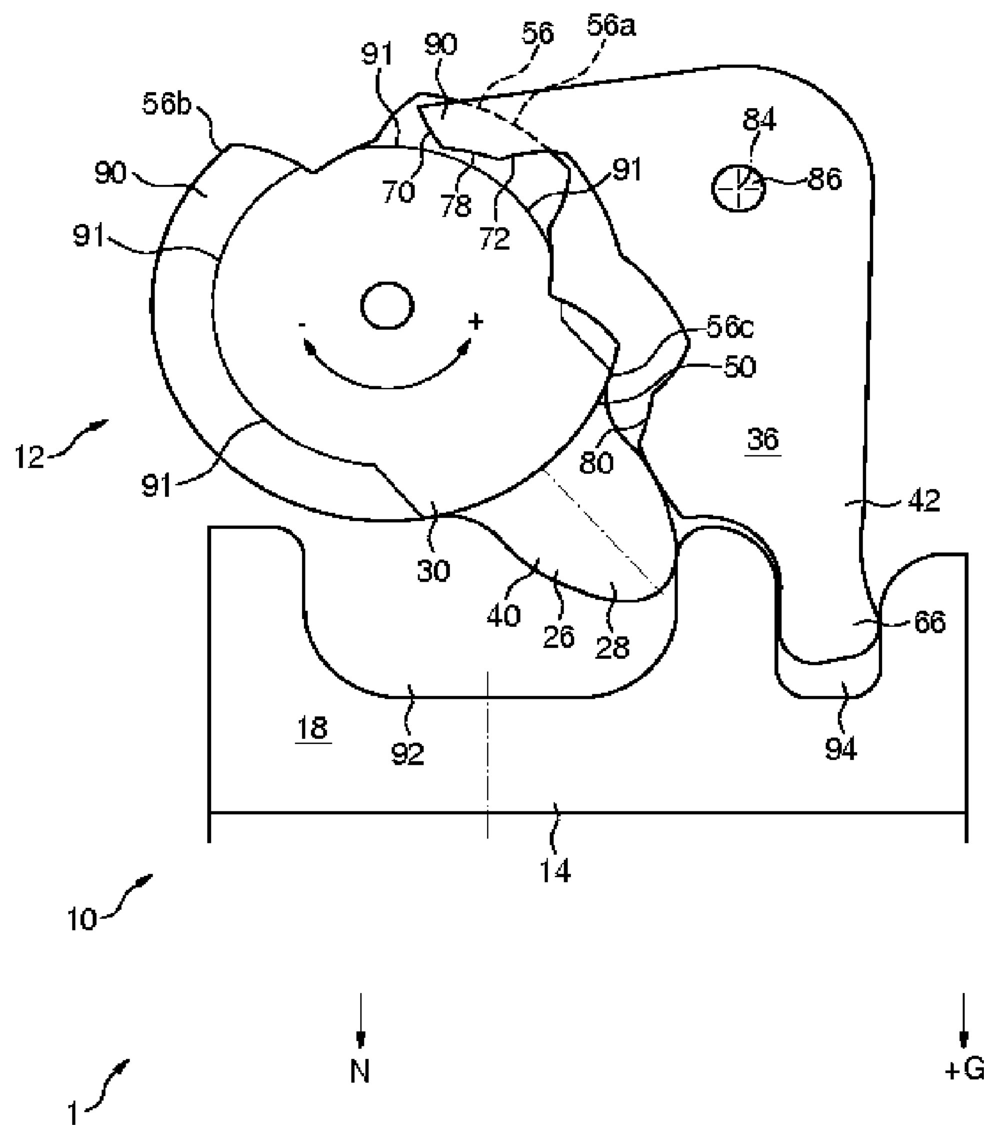
Figure 5:
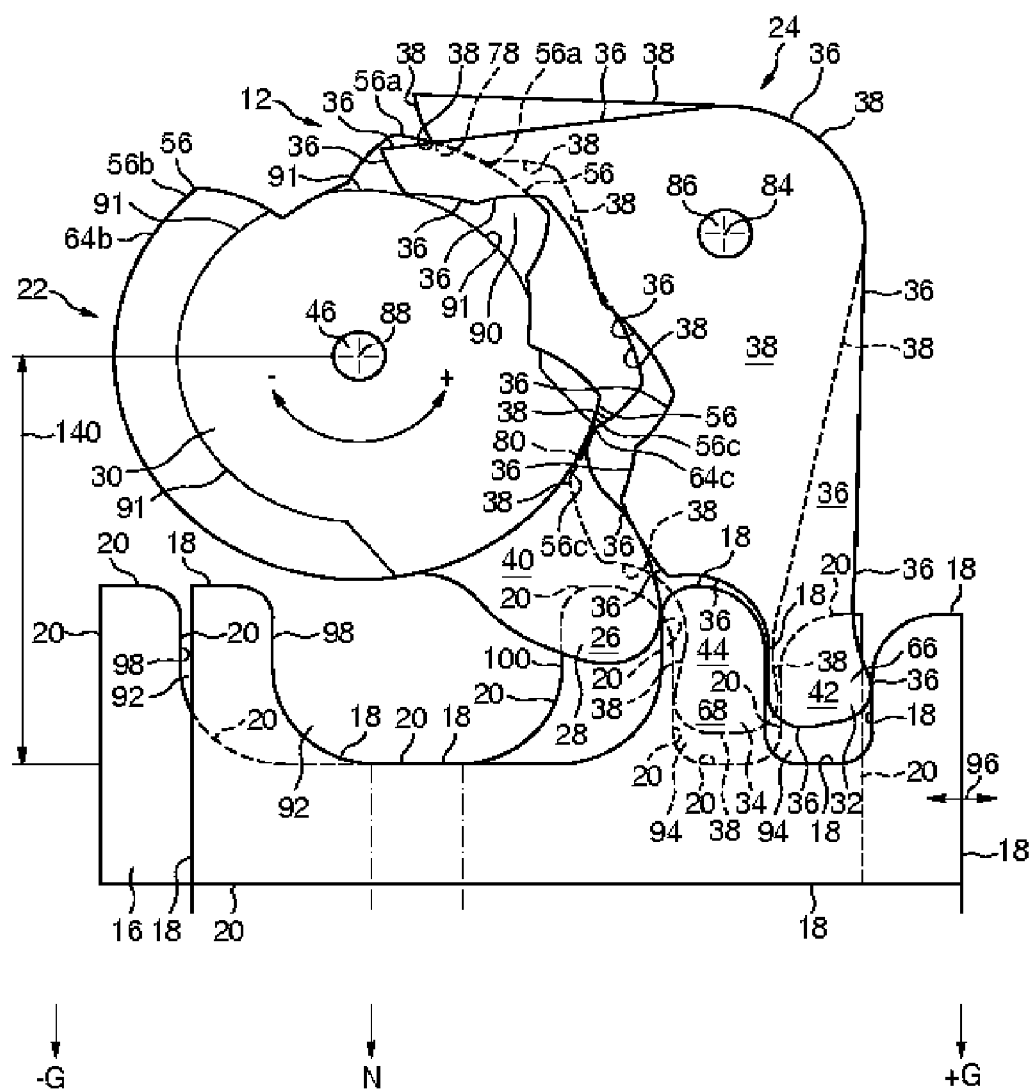

Compared to the gear position of the shift finger or the actuation position "gear position" or "+G" shown in FIG. 4, the shift finger in the position shown in FIG. 2 has been moved back into its neutral position (actuation position "neutral"). The cooperation of other disengagement levers 36, 38, which in the previously described engagement of a gear via shift finger 28 are assigned to shift gates other than the shift gate in which the shift finger has engaged the gear in a prescribed manner, is further described below. FIG. 2 or viewing FIGS. 2 and 4 together reveals that shift finger 28 or shift element 30 may be moved from its gear position, in which it can be moved in order to effect the engagement of a gear of the transmission (see FIG. 4), can be moved back into its neutral position (see FIG. 2) by movement in the shift direction without this movement causing the previously engaged gear to be disengaged (see FIG. 2). If shift finger 28 is shown in the neutral position or central position shown in FIG. 2, it may be moved for the selection or a select direction. According to FIGS. 1 to 5, the select direction extends perpendicular to the focal plane. The shift finger may therefore be moved in the axial direction or in the direction of axis 88, especially in a translatory manner. One or more clearances that enable this axial movement of shift element 30 (in the select direction), thus, in the illustration of FIG. 2 an axial movement into or out of the image plane, are therefore formed between disengagement lever 36 or disengagement levers 36, 38 and shift element 30 or between shift rail 18 or shift rails 18, 20 and shift element 30. Shift element 30 or shift finger 28 is then located in the neutral position. It should be noted that these clearances are not to be confused with clearance 90, which was already discussed within the context of FIG. 1. Regarding the clearances mentioned in connection with FIG. 2, rather, what is meant is that the disengagement lever 36, 38 or shift rails 18, 20 are formed and arranged in such a manner that shift element 30 may be moved with shift finger 28 in the select direction if this shift element 30 or this shift finger 28 is in its neutral position. Shift element 30 or the shift finger is therefore not hindered in this movement in the direction by running against one of disengagement levers 36, 38 or shift rails 18, 20.

Due to this type of movement of the shift element 30 or shift finger 28 in the select direction, the shift element may be moved in such a manner that a plane situated in the axial direction of shift element 30, in which a surface profile 58 is arranged, is positioned in such a manner that it is essentially positioned in a plane with disengagement lever 36, the shift finger arranged in a parallel plane is positioned in the select direction in such a manner that it can cooperate with another shift mechanism 16, such as an adjacent one. However, shift element 30 may also be positioned in the select direction in such a manner that shift finger 28 is able to cooperate with shift rail 18 or shift mechanism 14 or is arranged in the corresponding plane of this shift rail and the profile 58 of shift element 30 in a plane parallel thereto in which it is able to cooperate with another disengagement lever 20.

First, the case must be considered that the shift element is in such a select position in which profile 58 or disengagement flanks 48, 50 of shift element 30 are positioned in such a manner that they essentially lie in a plane with disengagement lever 36 (shift element viewed at the level of the disengagement flanks; FIG. 2). In this case, shift finger 28 is arranged in a parallel plane, which, for example, is such that it can cooperate with another disengagement lever 38 that differs from disengagement lever 36 in order to engage, for example, a gear.

Viewed on the aforementioned plane of the disengagement flanks, the following case in particular presents itself: When there is a rotation or swiveling of shift element 30, disengagement lever 36 is moved in the same or opposite direction via contact against flanks 48 and 70 or 50 and 72, respectively, depending on the direction of swivel or rotation of this shift element 30. If shift element 30 is swiveled clockwise in the position shown in FIG. 2, disengagement flank 48 of the shift element comes into contact with disengagement flank 70 of disengagement lever 36 in such a manner that disengagement lever 36 is loaded via disengagement flank 70. Disengagement flank 70 is arranged, with respect to swivel axis 84 of disengagement lever 36, in such a manner that disengagement lever 36 also swivels in the clockwise direction. If shift element 30 is swiveled in the counterclockwise direction, at the position shown in FIG. 2 disengagement flank 50 of shift element 30 comes into contact with disengagement flank 72 of disengagement lever 36, which is swiveled in accordance with a gear position "+G", in such a manner that when shift element 30 swivels counterclockwise, disengagement lever 36 is swiveled in the clockwise direction. For this purpose disengagement flank 72 is arranged accordingly with respect to swivel axis 84 of disengagement lever 36.

Not shown in FIGS. 1 to 5 is the corresponding case that shift rail 18 is positioned in accordance with the other gear position assigned to it "−G". At this position, disengagement finger 66—provided that the shift finger were also positioned in "neutral—would be swiveled toward shift element 30 and region 120 in which the surface profile or a portion of the surface profile forms flanks 70 and 72 of disengagement lever 36, is swiveled away from shift element 30, or another section 122 of disengagement lever 36, on whose surface disengagement flanks 74, 76 are formed, is swiveled toward shift element 30. In this type of excursion position of disengagement lever 36 corresponding to a gear "−G", when shift element 30 is swiveled out of the neutral position in the clockwise direction, disengagement flank 54 of shift element 30 would come into contact with disengagement flank 76 of disengagement lever 36 in such a manner that disengagement lever 36 is swiveled counterclockwise. The disengagement flank 76 is positioned accordingly with respect to swivel axis 84 of disengagement lever 36. Starting from this excursion position of disengagement lever 36, which corresponds to gear position "−G", when shift element 30 is swiveled in the counterclockwise direction, disengagement flank 52 of shift element 30 would come into contact with disengagement flank 74 in such a manner that this disengagement lever 36 is swiveled in the counterclockwise direction. In any case, the swiveling of shift element 30 effects a swiveling of this disengagement lever 36, which is deflected out in accordance with a gear position "+G" or "−G" of shift rail 18, the swiveling being such that this disengagement lever 36 is moved in the direction of the neutral position, or the shift rail, which is deflected out in accordance with a gear position "+G" or "−G", is moved in the direction of its neutral position by this swiveling of the disengagement lever or the rotation of disengagement lever 36, In any case, by corresponding rotation or swiveling of disengagement lever 36, shift rail 18 is swiveled back into its "neutral" position. If, as is also possible, a disengagement lever which is assigned to a shift gate in which shift finger 28 is not positioned at the time, or the shift rail assigned to such a disengagement lever is already located in a neutral position, it may preferably be provided that a swiveling of the shift element leaves the position of this disengagement lever or this shift rail essentially unchanged.

A basic functionality of a parallel-shift transmission or an "active interlock" basic functionality is that an old gear must be completely disengaged before a new gear is allowed to be engaged. In order for the disengagement of the gears via shifting shaft 48 and disengagement lever(s) 36 to meet this requirement even under the influence of tolerances and torsional play, the angle of rotation on shift element 30 for disengaging the gears is smaller than the angle of rotation for engaging the gears. In this context, the disengagement and engagement path on shift rail 18, 20 in each case is the same.

Therefore, it is provided in particular that both the disengagement of old gears and the engagement of a new gear may be effected by a movement of shift element 30 or a movement of shift finger 28 carried out here in the shift direction, and specifically with respect to the same transmission or partial transmission. This differentiation between transmissions or partial transmissions in which gears are to be disengaged, is made in particular with regard to different transmission design types. For transmissions in which only one gear may be engaged at a time, it is ensured that all gears that are assigned to other shift gates are disengaged. For transmissions in which one gear, but not a plurality, is allowed to be shifted at a time in different partial transmissions, such as in a parallel-shift transmission, it is ensured that, with respect to such a partial transmission, only one gear at a time may be shifted. It is provided in particular that, with respect to such a transmission or partial transmission in which only one gear is allowed to be shifted, via a constant movement or in particular a constant movement in the shift direction of shift element 30 or shift finger 28, it is possible, on the one hand, to engage a target gear and, on the other hand, any shifted gears of this partial transmission or transmission are disengaged or it is ensured that they are disengaged, whereby the shift element is translated differently for engaging a gear than for disengaging this gear with respect to the shift rail or the shift mechanism. This "translation" does not mean the gear ratio of the transmission, which is assigned different gear steps, rather, that a movement of shift element 30 during the engagement of a prescribed gear of the transmission is translated into a movement of a shift rail or the like that is assigned to this gear of the transmission, which is different from the translation between the movement of this shift element and the movement of this shift rail, which is present if this gear is disengaged again via a movement and in particular by means of a disengagement lever.

Explained below now is the case that arises if the shift element is positioned in such a way that shift finger 28 is positioned in the plane of disengagement lever 36, which is deflected out in accordance with gear position "+G" of shift rail 18 (shift element viewed at the level of the shift finger). Compared to the aforementioned case, shift element 30 is therefore offset here in the select direction, it being assumed that the position of the shift rail there corresponds to that shown in FIG. 2. If shift element 30 is moved in "−" direction or is moved from a neutral position in the shift direction into a region for the engagement of a gear "−G" of shift rail 18 (this corresponds in FIG. 2 to a swiveling in the clockwise direction; or rotation in the "−" direction), shift finger 28 disengages the gear (+G) that is shifted by means of shift rail 18. In this context, the shift finger carries along shift rail 18 via engagement in shift mouthpiece 92 or flank 98 and displaces it in a translatory manner. By engagement of disengagement finger 66 in disengagement mouthpiece 94, disengagement lever 36 follows the movement in such a manner that disengagement lever 36 is swiveled and is essentially transferred into a neutral position of disengagement lever 36. If in this way shift rail 18 is positioned in a neutral position in which no gear of the transmission is engaged via this shift rail or assigned shift mechanism 14 and shift element 30 is swiveled further, shift finger 28 will then reach a position region in which the other gear that can be engaged via shift rail 18, gear "−G" of this shift rail or of assigned shift mechanism 14, is caused to be engaged. Also in this context, disengagement lever 36 follows the movement of shift rail 18 in such a manner that it is swiveled further.

However, shift finger 28 may also be swiveled back into its neutral position if shift rail 18 has reached its neutral position, so that the position shown in FIG. 1 is reached. This may in particular be the case so that in this way all gears of the partial transmission or the transmission are disengaged.

If shift finger 28 or shift element 30 is swiveled in the direction of its actuation position "+G" from the position shown in FIG. 2 or rotated (rotation in "+" direction; viewed at the level of the shift finger), no disengagement of the gear "+G"—shifted by means of shift rail 18—is effected. Shift finger 28 moves in the direction of shift rail 18, which is still engaged.

FIG. 3 shows another position of the designs shown in FIGS. 1 and 2. The shift position in this case is "neutral", so that shift rail 18 is in a position at which no gear of the transmission is engaged by means of this shift rail or the assigned shift mechanism 14. The actuation position, that is, the setting or position of shift element 30 or shift finger 28 or main actuator element 26, in this case is such that shift finger 28 is deflected out from a neutral position shown in FIGS. 1 and 2 in the direction of a position region to which an engaged gear position is assigned. However, the shift finger is not yet in this position region; rather, it is in a position at which a further movement in the direction of this position region would cause the shift finger to load the shift rail in the direction of gear position "+G". The shift finger therefore has just gone past its "idle stroke", which is present between its neutral position in direction "+G" and would carry shift rail 18 along if swiveled or moved further. This actuation position or setting is characterized as "+Neutral" position of the shift finger. In a corresponding manner (not shown), a "−Neutral" position of the shift finger is run against.

FIG. 4 shows an additional position of the embodiment according to FIGS. 1 to 3. In the position according to FIG. 4, the shift position and the actuation position of each is "+G". Main actuation element 26 or shift finger 28 is therefore in a position or a position region at which, when reached, a gear of transmission 10 is engaged or is assigned to the one engaged gear position of the transmission. In this case, this is shift rail 18 or the gear "+G" assigned to shift mechanism 14. Shift rail 18 or corresponding shift mechanism 14 is likewise in a gear position in which or through which a gear of the transmission is caused to be engaged. In the exemplary embodiment according to FIGS. 1 to 5, and this may also apply to the exemplary embodiments according to FIGS. 6 to 11, and in some cases also to the exemplary embodiments according to FIGS. 12 to 14, a suitable position of a particular disengagement lever corresponds to the position of a particular shift rail, because the disengagement lever is carried along by the assigned shift rail or vice-versa.

As a result, disengagement lever 36 in the design according to FIG. 4 is also in a position that may be characterized here as "+G". In FIG. 4, shift element 30 is positioned in such a manner that shift finger 28 is positioned essentially in a plane with disengagement lever 36. It has already been mentioned that shift element 30 in the plane of shift finger 28 has one or more clearances 90 that enable a disengagement lever to swivel into this clearance. It is shown in FIG. 4 that the disengagement lever swivels into clearance 90, which only exists on the plane of shift finger 28. The locking part or locking cylinder 56 of shift element 30 is arranged according to FIG. 4 in a plane that is offset with respect to disengagement lever 36, so that the locking flank 78 or 80 of the disengagement lever does not rest against or stop against locking part 56 of the shift element, rather, as already mentioned, is able to swing into a clearance 90 of shift element 30. The cooperation of a disengagement lever 38 positioned in plane that is arranged offset with respect to shift finger 28 is not shown in FIG. 4 and is explained below with reference to FIG. 5. As mentioned, external lever 36, which is situated in the plane of shift finger 28, swivels into clearance 90 of shift element 30 if shift finger 28 is in a position assigned to the engaged gear of the transmission, that is, in an actuation position "+G" according to FIG. 4.

In a corresponding manner, disengagement lever 36 or 38, which in each case is situated in the plane of shift finger 28, also swivels into a clearance 90 of shift element 30 if shift finger 28 is in a different gear position assigned to the same shift gate, that is—which is not shown in FIG. 4—in each case is moved into the gear position "−G". Because in this context—starting from FIG. 4—the shift rail 18 that is there is displaced to the left up to position "−G", the disengagement lever is swiveled accordingly. While the position of disengagement lever 36 shown in FIG. 4 is swiveled along with its locking flank 78 into clearance 90, at the aforementioned "−G" gear position, it would swivel along with its locking flank 80 into clearance 90.

Clearance 90 exists on shift element 30 only on or in the plane of shift finger 28, so that the disengagement levers or all remaining disengagement levers that are assigned to the same transmission or—especially in the case of a parallel-shift transmission or twin-clutch transmission—to the same partial transmission cannot swivel into such a clearance 90, so that by means of them—especially when there is a constant movement of shift finger 28 in the shift direction and especially driven by shift element 30—the gears of (all) other shift gates of the same transmission or partial transmission are locked and/or disengaged. The cooperation of these different disengagement levers with the main actuation device or shift element 30 is explained below in reference to FIG. 5. Clearance 90 is essentially designed in such a manner that shift element 30 or shift finger 28, starting from the gear position, may be swiveled back into its neutral position without disengagement lever 36 in the process being moved or swiveled or carried along. This is achieved in the exemplary embodiment according to FIGS. 1 to 5—the same may also apply for the remaining exemplary embodiments—essentially by virtue of the fact that, in the region into which disengagement lever 36 is swiveled, there are essentially no profiles of the surface shell which are such that disengagement lever 36 would be loaded when the shift element is swiveled. An especially suitable surface design, shown in FIG. 4, may be such that the surface shell of shift element 30 in the plane of shift finger 28 in the regions in which disengagement lever 36 is able to engage in clearance 90 is designed in an essentially cylindrical shape or in the manner of a cylindrical segment.

FIG. 5 shows the engagement conditions of the state described above for the adjacent shift rail in the same partial transmission or transmission. Shown in particular in FIG. 5 is, on the one hand, the position explained with reference to FIG. 4 in which shift finger 28 is positioned along with disengagement lever 36 in a plane, this disengagement lever 36 engaging in shift rail 18 and shift finger 28 and shift rail 18 or shift mechanism 14 each being in a "+G" position; on the other hand, another disengagement lever of secondary actuator device 24 in particular is shown that is assigned to the same transmission or—especially in the case of a parallel-shift transmission or twin-clutch transmission—the same partial transmission. Disengagement finger 68 of disengagement lever 38, which in this case forms an output element 44, engages in a shift rail 20, which is arranged adjacent to or offset with respect to shift rail 18. For this purpose, shift rail 20 exhibits a second cutout 94 in the manner already described above. Shift rail 20 also exhibits a previously described first cutout 92. However, shift finger 28 is arranged according to FIG. 5 in the first cutout or shift mouthpiece 92 of shift rail 18 and not in the first cutout or shift mouthpiece 92 of shift rail 20. Shift finger 28 therefore operates in a shift gate in which the gears assigned to shift rail 18 or shift mechanism 14 may be engaged. Shift rail 20 is assigned to a shift mechanism 16 that is different from shift mechanism 14.

While shift finger 28 moves shift rail 18 from the "Neutral" position of this shift rail 18 in the direction of gear position "+G" or "−G" of this shift rail 18, an undesired towing along of adjacent shift rail 20 of the same partial transmission or transmission is prevented via locking cylinder 56 and locking flank 78 or locking flanks 78, 80. As mentioned, shift rail 18 is shown in FIG. 5 in a position in which the gear "+G" assigned to it is engaged, and shift finger 28 is positioned in a corresponding position or a corresponding position region or an actuation position "+G". It is apparent from FIG. 5 that in this actuation position "+G" of shift finger 28 locking flank 78 of the (other) disengagement lever 38 cooperates with locking cylinder 56 or a section thereof 56*a* in order to block disengagement lever 38 in one orientation of the swiveling direction. In the design according to FIG. 5, this orientation is such that a swivel movement of disengagement lever 38 in the counterclockwise direction is hindered or blocked, and in particular by virtue of the fact that locking flank 78 runs against locking part 56 or a section 56*a* thereof.

In a corresponding manner, a swiveling movement of disengagement lever 38 in the opposite orientation—in this case in the clockwise direction—is hindered or blocked via the cooperation of locking flank 80 of disengagement lever 38 with locking part 56 or its section 56*c*. This is effected in particular by virtue of the fact that locking part 56 or a section thereof 56*c* forms a limit stop for locking flank 80.

Locking part 56 or a section thereof 56*a* and 56*c* and locking flanks 78 and 80 are each formed and designed in such a way that a (swivel) movement of disengagement lever 38 is hindered, though a swiveling movement of shift element 30 is made possible. Furthermore, the design in this case is such that this locking effect is maintained within a certain (swivel-) position region of shift element 30.

This is achieved in this exemplary embodiment by locking part 56 or sections thereof 56*a* and 56*c* each extending over a certain region concentrically with respect to swivel axis 88 of shift element 30; locking flanks 78 and 80 of disengagement lever 38, by contrast, do not extend—concentrically—with respect to swivel axis 84 of disengagement lever 38.

In this way, shift element 30 may be swiveled without the swiveling movement being hindered by disengagement lever 38. Shift element 38 may therefore also be moved, for example, out of the position shown in FIG. 5 into its actuation position "Neutral" or into its "Neutral" position, the locking position of disengagement lever 38 being maintained at least over a certain swiveling range.

The aforementioned locking position of the disengagement lever is already reached before shift element 30 has reached its actuation position "+G", so that before the engagement of the gear "+G" to which shift rail 18 is assigned, disengagement lever 38 is in a locking position. This also becomes clear from FIG. 3, in which it should nevertheless be noted that this disengagement lever 36 that is shown there is located in the plane of the shift finger and not, like disengagement lever 38 in FIG. 5, in a plane arranged parallel thereto. Disengagement lever 36 is therefore located, with respect to the axial direction of shift element 30 at a place in which there is a clearance 90. However, also in the design according to FIG. 3 a disengagement lever 38—not shown there—is provided that is able to cooperate with surface profile 58, which is arranged in a plane of the swiveling part that is parallel to disengagement finger 28. Because swivel axes 84 of the disengagement levers—at least in relation to the same partial transmission in the case of, for example, a parallel-shift transmission or twin-clutch transmission—are concentric in the exemplary embodiment according to FIGS. 1 to 5, a disengagement lever cooperates in the parallel plane with profile 58 of shift element 30. In view of this, FIG. 3 clarifies that a disengagement lever arranged on the parallel plane already cooperates there with surface profile 58 of the swivel part, and specifically so that, already in the position shown there, disengagement lever 38 is hindered from swiveling or is in a locking position via the cooperation of locking flank 78 with locking part 56 or a section thereof 56*a* and via the cooperation of locking flank 80 with locking part 56 or a section thereof 56*c*.

However, in FIG. 3, as mentioned above, shift finger 28 is not in a position assigned to a gear, but rather, in the position "+Neutral", so that shift rail 18 there is still in a neutral position. If, starting from the position shown in FIG. 3, there is a further shift into the position shown in FIG. 5, disengagement lever 36, which engages in shift rail 18, swivels into clearance 90 of shift element 30, and disengagement lever 38, which is arranged in a plane arranged offset thereto, is further held in a locking position via the cooperation of locking flank 78 with section 56*a* of locking part 56 or the cooperation of locking flank 80 of disengagement lever 38 with section 56*c* of the locking part 56. It is therefore ensured that even before the gear position is reached—and in this case during a movement of the shift finger in the shift direction—the gears in the shift gates in which the target gear is not situated are disengaged or are locked (in this case by means of shift rail 20 via the cooperation of the main actuator device and the secondary actuator device or in this case disengagement lever 38.

The conditions are analogous if shift rail 18—which is not shown in FIG. 5—is in a gear position of the other gear assigned to it (Gear "−G") or is shifted from the neutral position into this position. In this context, locking flank 78 of disengagement lever 36 cooperates with section 56*b* of locking part 56 and disengagement flank 80 of disengagement lever 36 cooperates with section 56*a* of locking part 56 for the locking.

The at least one surface profile 58 of main actuation device 22 or shift element 30 and surface profiles 82 of secondary actuator device 24 or disengagement levers 66, 68 are each symmetrically formed, which is clearly recognizable in FIG. 1. The surface profiles 58, 82 are symmetrically formed in an advantageous manner, at least in the areas that cooperate with another surface profile.

As dashed line 108 in FIG. 1 makes clear, which is supposed to indicate a bisecting line or a plane of symmetry with regard to the surface profile or surface profiles 58 of shift element 30, this surface profile 58 is symmetrically formed with respect to the bisecting line or plane of symmetry 108. This bisecting line or plane of symmetry is situated radially with respect to swivel axis 88 of shift element 30. Dashed line 110 in FIG. 1 symbolizes a bisecting line or plane of symmetry of surface profile 82 of a particular disengagement lever 36, 38. This bisecting line or plane of symmetry 110 also is radially situated with respect to swivel axis 84 of particular disengagement lever 36, 38. As FIG. 1 further makes clear, there exists for each disengagement lever 36, 38 of the transmission or—especially in the case of a parallel-shift transmission or twin-clutch transmission of the same partial transmission—preferably a relative position of shift element 30 with respect to associated disengagement lever 36, 38 at which bisecting lines or symmetry planes 108, 110 of profile 58 of shift element 30 intersect with that of the particular disengagement lever 36, 38.

In an especially advantageous manner, the surface profiles 58, 82 are each formed in such a manner that they have not undercuts. Surface profiles 58 of this type of the main actuator device or of shift element 30 have disengagement flanks 48, 50, 52, 54 and locking parts or locking cylinders 56, 56*a*, 56*b*, 56*c* or the like. The surface profiles 82 of the secondary actuation device or of disengagement levers 36, 38 each have locking flanks 78, 80 and disengagement flanks 70, 72, 74, 76.

The characteristics described above or the cooperation between shift element 30 disengagement lever(s) 36, 38 and the shift rail(s) in direction "+G" are also applicable for the movement in direction "−G", which is also attributable in particular to the symmetric design of the "active interlock" geometry or geometries (see also bisecting lines 108, 110 in FIG. 1).

With regard to FIGS. 1 to 5, two disengagement levers 36, 38 and the shift rails 18, 20 assigned to them, which are a component of a particular shift mechanism 14, 16, were mentioned. However, this design may also be used in transmissions or partial transmissions in which there are more than two shift mechanisms or more than two shift rails or the like that are assigned to the transmission or the same partial transmission. In a design of this type, it is provided in particular that the disengagement or locking functionalities described above each operate in all shift gates in which the shift finger is not positioned or is not moved in the shift direction in order to engage a gear. In such designs, preferably there are therefore more disengagement levers and shift rails. The profile or the profiles of the main actuator device or shift element 30 in this context may be designed correspondingly wide so that they are able to cooperate with a plurality of adjacently arranged disengagement levers; it may also be provided that each is provided with a separate profile for cooperation with different disengagement levers. However, in a preferred embodiment, it is provided in cases of this type that—viewed in the axial direction of shift element 30—on both sides of the plane in which the shift finger is disposed, profiles are provided in such a manner that they are able to cooperate with (n−1) shift rails or shift mechanisms or disengagement levers or the profiles of these disengagement levers, n being the number of shift mechanisms or shift rails of the transmission (e.g. in a manual-shift transmission or automated-shift transmission) or partial transmission (e.g. in a twin-shift transmission or parallel-shift transmission). If there are a plurality of partial transmission, and the number of shift rails in them is different, e.g. on the one hand n and on the other hand m, it is preferably provided that "n" is larger than "m" if the same shift element is provided for both or more than two partial transmissions or, as desired, is to be used in them.

In this way it may be achieved that, independent of which shift rail (of the transmission or partial transmission) shift finger 28 acts on, the disengagement and/or locking function operates in all remaining shift gates of the same transmission or partial transmission.

As mentioned, the design may be used in transmissions in which there are parallel drive train sections, such as a parallel-shift transmission or a twin-clutch transmission. In such transmissions, the design explained with reference to FIGS. 1 to 5 may be used, for example, in such a manner that for each of the partial transmissions, each of which is assigned to a parallel-shift drive train section, the explained disengagement or locking function, when shifting into a gear by means of the main actuator element or the shift finger, operates in all shift gates of this partial transmission other than the shift gate of the target gear so that it is guaranteed that only one gear of the particular partial transmission may be engaged at a time.

In this design, it may be provided that this applies in relation to both partial transmissions. In this context it may be provided that exactly one main actuation device or a shift element 30 is provided that—as desired—is able to act on both partial transmissions in order to shift gears there. However, it possible in this context that a gear of the one partial transmission is shifted if a gear of the other partial transmission is simultaneously shifted. The disengagement or locking function is therefore provided separately for each partial transmission. In the manner already outlined above, it may be provided in this context that suitable disengagement levers are provided in both partial transmissions.

In transmissions that do not have parallel drive train sections, such as manually shifted transmissions or automated-shift transmissions, it may be provided in particular that the disengagement or locking function operates in all shift gates that are different from the shift gate in which the main actuator element is moved for the engagement of a gear.

For this reason, a distinction of "transmission or partial transmission" was mentioned.

The actuator device 12 is preferably preassembled and placed as a unit or assembly group on the transmission or mounted by means of appropriate fasteners. Shifting shaft 46 and shaft 86 can be stored, for example, in a transmission actuator or a housing. It may be provided that the unit is preassembled from this transmission actuator and the actuator device or the housing and the actuation device as an assembly group—also especially with shaft 86 and shifting shaft 46—is preassembled and placed or mounted on the transmission.

The actuation device 12 or the described functional module offers the advantage that the geometries responsible for the disengagement and locking function are only subject to the tolerance influence of the axis spacing between shift element 1 and disengagement lever(s) 36, 38. The axis mounting of these two parts is situated, for example, in the transmission actuator. In this way there is no influence on the "active interlock" functional geometries on the transmission side. The dimension schematically indicated by double arrow 140 in FIG. 5 shows a decisive tolerance influence of the "active interlock" core module on the transmission components, which is to a considerable extent required by the assembly. Based on the design in the contact between shift finger 28 as an involute shape or disengagement finger 66, 68 as a radius shape and the counter flanks 98, 100, 102, 104 as straight or flat flanks, it is achieved that dimension 140 receives a subordinate or an absolutely subordinate significance for the cooperation between shift element 30, disengagement lever(s) 36, 38 and shift rails 18, 20. Another advantage is that except for the straight-flanks of cutouts 92, 94, the requirements of shift rails 18, 20 are relatively small. It may be provided in an advantageous embodiment that sections 92, 94 are only produced by stamping of sheet metal.

The possibility of transferring the system to transmission variants having a larger or smaller shifting path also proves itself to be an advantage of actuation device 12 or the "active interlock" core module. For this case, one only needs to adapt the length of the active shift finger 28 and/or active disengagement finger 32, 34 to the desired shift path. The remaining geometries, especially all geometries, may be maintained. In the design according to FIGS. 1 to 5 a (separate) disengagement lever 36, 38 is provided for each shift rail 18, 20 of the transmission. The disengagement levers are subject to relatively low disengagement forces. In an advantageous embodiment, they may therefore be made of plastic and be manufactured, for example, as a plastic injection-molded part, which represents a very favorable solution.

FIG. 6 shows an actuation device 12 or an "active interlock" core module for a special transmission design form in which partial transmissions 150, 152 are arranged next to you in pairs with disengagement levers 36, 38. Disengagement levers 36, 38 in particular are arranged next to each other for partial transmission 52 and disengagement levers 36, 38 for partial transmission 150. In a corresponding manner, the shift rails of the partial transmission or corresponding elements may each be arranged next to each other in pairs. Furthermore, possibilities according to the invention with which the shift scheme or the shift pattern may be illustrated will be shown in reference to FIG. 6 as also in reference to FIGS. 7 to 11. This is also characterized as "gate functionality".

The determination or illustration of the shift scheme or shift pattern plays a role, especially in such transmissions or transmission devices, in which the transmission or shift operations in the transmission are electronically controlled. Electronic controls for transmissions are already known and are used, for example, in so-called automated-shift transmission (ASG). Even in twin-clutch transmissions or parallel-shift transmissions, electronic controls are used as a rule. Electric motors are generally used for this purpose. This may be so that one electric motor is used for the select operation and one electric motor for the shift operation. It may be provided, for example, that one electric motor is provided in order to axially adjust a shifting shaft and one electric motor in order to adjust such a shifting shaft in the direction of rotation or swiveling direction. Electric motors may cooperate in this context with an electronic control device that drives electric motors or the power supply of the electric motors. Electronic control devices of this type may in turn be in operative connection with one or more electronically controlled clutches, such as clutches of a twin-clutch transmission or parallel-shift transmission or automated-shift transmission, that act as a types of starting clutches. By means of such an electronic control device, actuation processes of the clutch and transmission may be coordinated with each other. Furthermore, such an electronic control device may be in operative connection with the internal combustion engine of a motor vehicle. In this case parameters, for example, may be exchanged or transmitted. This may, for example, make it possible that parameters of the internal combustion machine are also used for the control of the clutch and/or of the transmission.

Such drive clutches and transmissions may be components of a drive train of a motor vehicle that transfers energy from the internal combustion engine of a motor vehicle to its drive axles. Designs of this type and in particular also such a drive train are also, independent of the design according to FIG. 6, preferred embodiments of the invention, whereby, in this case an actuator device according to the invention or a transmission device according to the invention may in particular be provided.

The arrangement according to FIG. 6 makes it necessary that between partial functional elements a distance 154 of one shift rail width must remain free of "active interlock" functional elements. This relates in particular to a design in which—as is shown in FIG. 6—two disengagement levers 36, 38 each are provided for the two partial transmissions 150, 152 and partial transmissions 150, 152, accordingly each have two shift rails or corresponding elements or shift mechanisms. However, it is also possible that more than two disengagement levers are provided in one or both of the partial transmissions 150, 152, or each particular corresponding partial transmission 150 or 152 has more than two shift rails. It is logical in such a case that distance 154 is accordingly adjusted in such a manner that it is ensured that each gear may be shifted in each of the partial transmissions 150, 152, and in this context all other gears of the partial transmission may be disengaged by means of an actuation device according to the invention, and in particular without acting on the other partial transmission or disengaging gears there in the process. It therefore makes sense in this context that distance 154 corresponds to (n−1) times the shift rail width or the width of disengagement level 36, 38, n being the greater number of disengagement levers 36, 38 or shift rails that is present in the one or the other partial transmission. Provided that there is more play between the shift rails or the disengagement levers of a partial transmission, it makes sense if distance 154 is enlarged by this amount of play.

Figure 7:
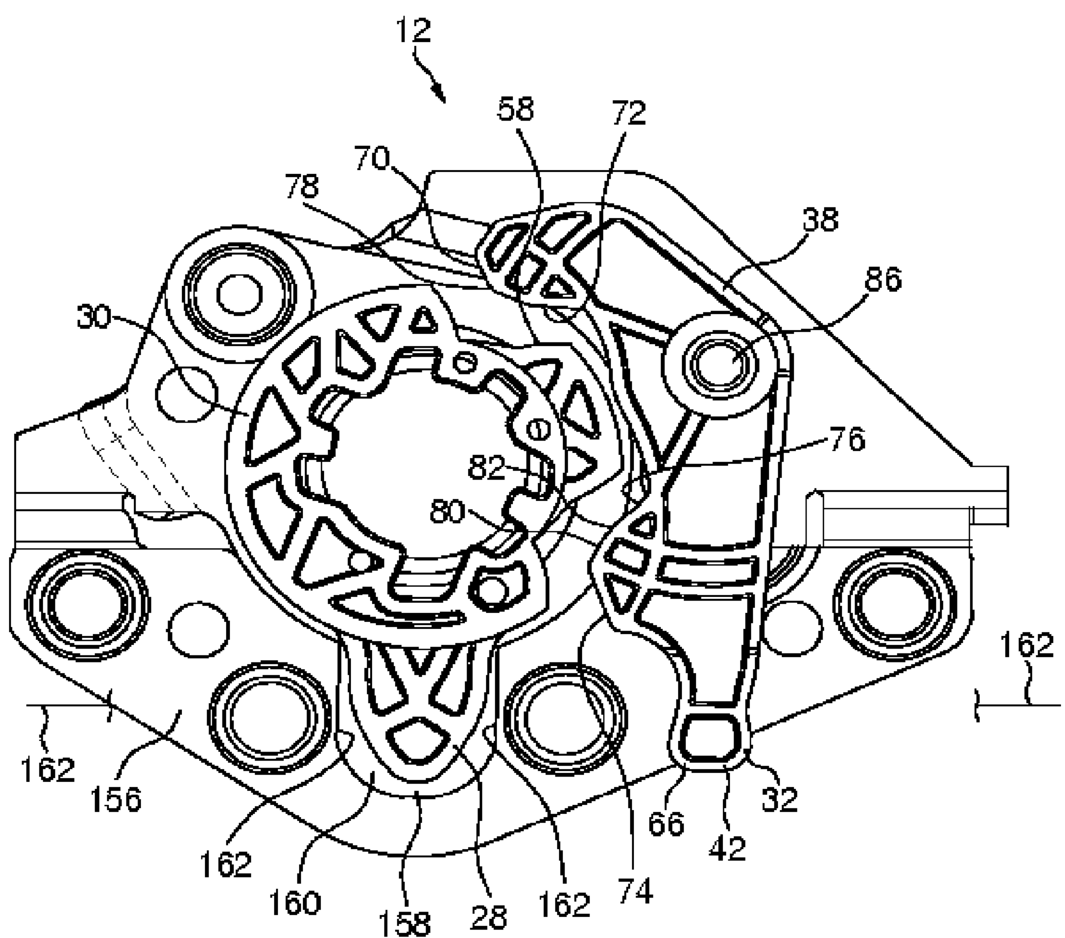
FIG. 7 shows a sectional view along line VII-VII of FIG. 6.

In the design according to FIG. 6, distance 154 or the intermediate space there is filled or partially filled in with a fixed plate 156. This plate 156 may serve as a reference for the "neutral" shift position or actuation position. For this purpose, this plate, as shown in FIG. 7, which depicts a section along line VII-VII from FIG. 6, may have an opening 158, which is such that shift element 30 may be axially moved through it within a prescribed position range. This position range is such that a special cutout 160 is provided in plate 156 for shift finger 28 and is present only in a prescribed swivel position range of shift element 30. If shift finger 28 is positioned outside of this swivel position range, the plate hinders shift element 30 from being able to be moved by them. Cutout 160 in this context is essentially positioned in such a manner that the shift element may be moved through opening 158 if it is in a neutral position. For the detection of the neutral position using control technology, shift finger 28 is run into the range of cutout 160, the limitation by flanks 162 in the rotation direction being determined then by means of the shift finger. Shift finger 28 may therefore be swiveled in this corresponding position in the one and the other orientation of the direction of rotation up to the limit stops on flanks 162.

Only in the aforementioned shifting shaft position or position of shift element 30 or swivel position of disengagement finger 28 can shift element 30 be run in the axial direction on any desired shift rail between the two partial transmissions 150, 152, independent of whether a gear is shifted or not. The position of the shift rails is schematically indicated in FIG. 7 by line 162.

If a state or a position corresponding to FIG. 3 occurs, then shifting shaft 46 or shift element 30 may be run in an axial direction within this partial transmission or the corresponding one. The axial limitation is given by plate 156 and—depending on the partial transmission—plate 164 or plate 166. This area inside the gate or the shift pattern or the area that is delimited by two axial stops each in the shift direction and the width of the neutral region in the select direction is also called an expanded neutral region. It may be provided that the extension of the expanded neutral region is determined first for the entire transmission generally, and in subsequent steps the extension of the expanded neutral region for the one partial transmission 150 and the extension of the expanded neutral region for the other partial transmission 152 in the select direction. This may be the case, for example, so that for the determination of the expanded neutral region for the overall transmission, the shift element is moved from one plate 164 to the other plate 166 in the neutral position, so that the extension of the expanded neutral region of the entire transmission is calculated as the distance of these limit stop positions. Next, wall 156 may then be sensed for each of the two partial transmissions 150, 152 by means of shift element 30 or shift finger 28 if the distance situated in the shift direction between this wall and wall 166 or wall 164 is specified as an extension of the expanded neutral region in the shift direction for the particular partial transmission. If a state according to FIG. 4 arises or if there is position according to FIG. 4, the shifting shaft or shift element 30 or shift finger 28 may be driven in the axial direction within a certain narrow clearance. The axial limitation is given by the depth of first cutout 92 or by different depths 168, 170 of the disengagement lever. The controller is then able to detect that a gearshift rail position "–G" or "+G" must be present within the gate or within the shift pattern.

Figure 8:
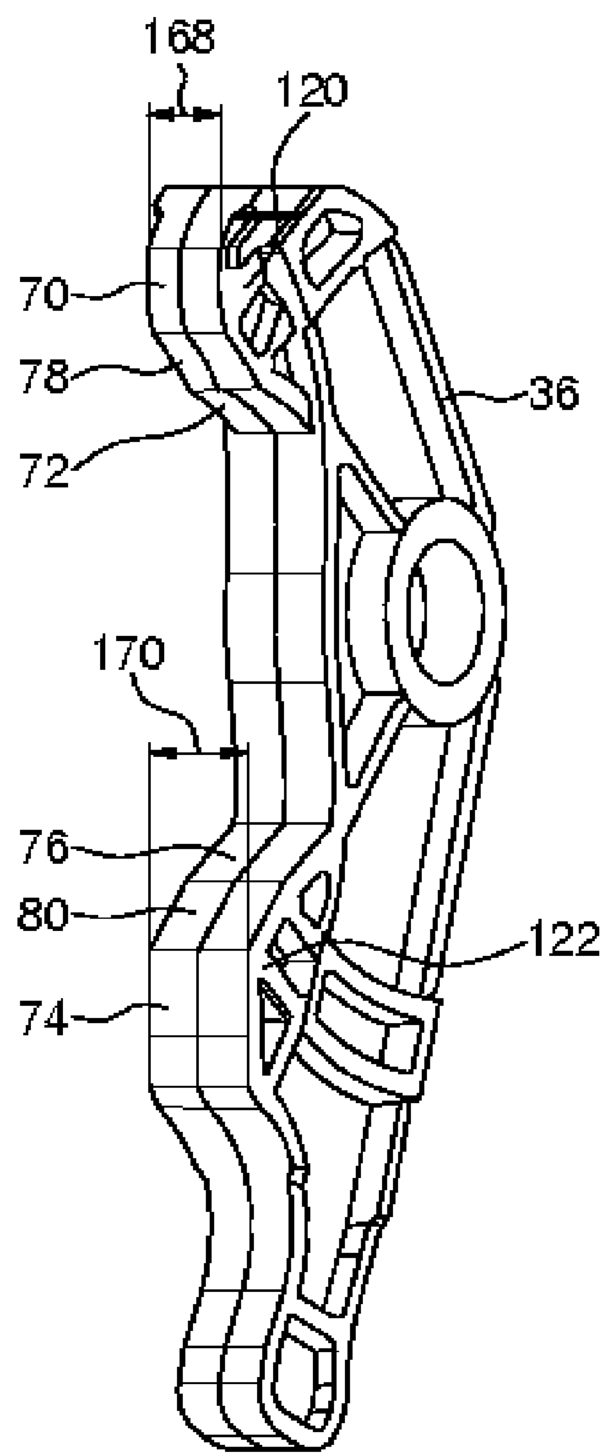
FIG. 8 shows an exemplary disengagement lever for an actuator device according to the invention, which can preferably be used in the exemplary embodiments according to FIGS. 1 to 5 or 6 and 7 or 10 and 11.

In an advantageous embodiment, depth 168 or 170 of disengagement lever 36, 38 is different, as shown in FIG. 8, in regions 120 and 122. For example, in this way it may be achieved that—depending on the swivel position of the disengagement lever—two different axial displacement paths of the shifting shaft or shift element 30 are detected in the aforementioned displacement (movement) within the narrow clearance. It may be determined by means of this difference whether shift element, especially in relation to the particular shift gate, is turned in the "+G" direction or in the "–G" direction. In this way, it may be determined more specifically which of the gears assigned to the shift rail is engaged.

Figure 9:
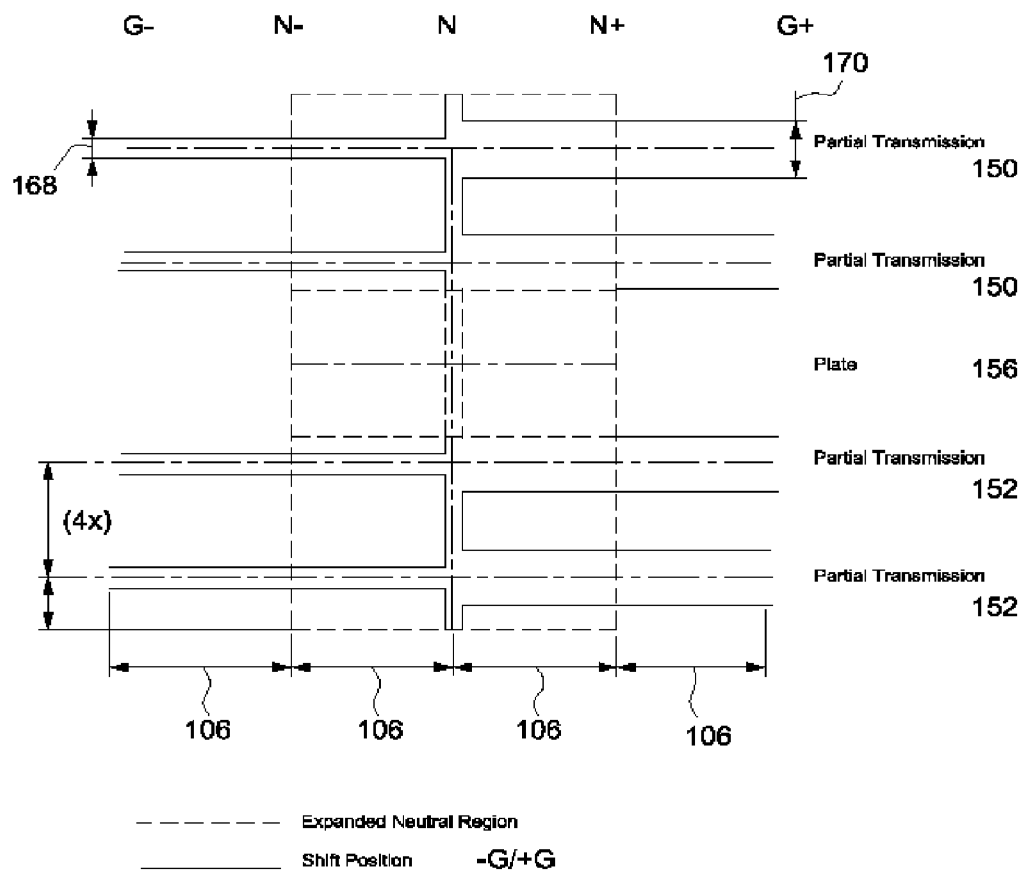
FIG. 9 shows a shift pattern that refers in particular to the embodiment according to FIGS. 6 and 7.
Figure 10:
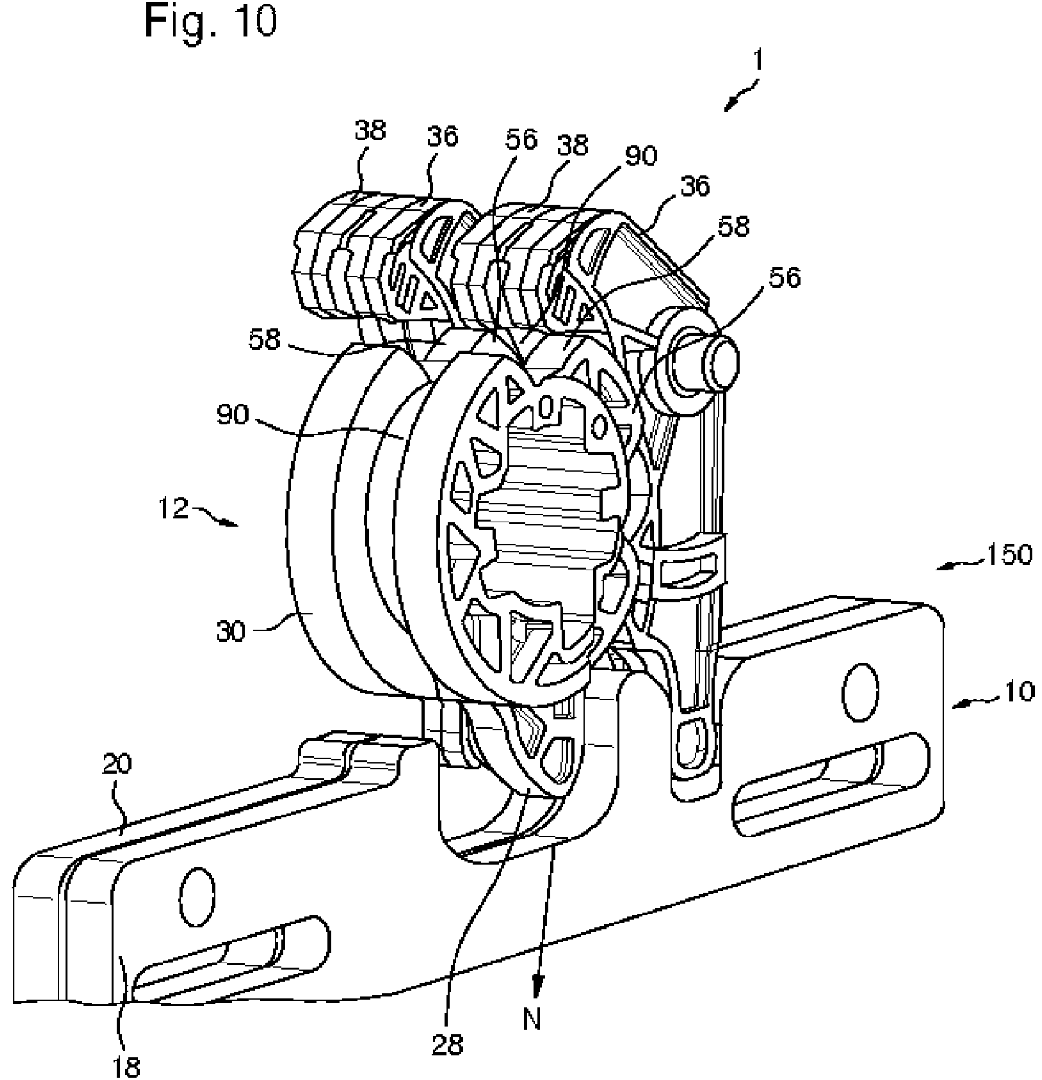
FIGS. 10 and 11 show an example of an exemplary embodiment according to the invention that may be combined, for example, with the exemplary embodiment according to FIGS. 1 to 5 and/or FIGS. 6 and 7 and/or according to FIG. 8, in different positions and for explaining how a shift pattern may be established; and, FIGS. 12 to 14 show further exemplary embodiments according to the invention, which in particular may be combined with features of the embodiments according to FIGS. 1 to 11.

FIG. 9 shows shift pattern ranges or gate ranges that are detected by the control, as illustrated. The peculiarity of the gate functionalities or the gate design or the shift pattern design is that the parameters or features, "expanded neutral range" and "shift position –G/+G" or their positions and/or dimensions, are dynamically set with the position of shift element 30 or disengagement lever 36, 38 at a given time. It is made possible in particular that these can be or are calculated from the general into the specific. A further feature in connection with the orientation of the control with reference to the gate conditions is the possibility of axially positioning shift element 30 between two shift rails of a partial transmission. In the rotation of shift element 30 (corresponding to the position according to FIG. 3) both shift rails are brought into the "neutral" position via the disengagement lever. In this context, shift element 30 may be turned exactly far enough (see FIG. 10) until the two shift rails 36, 38 have reached the "neutral" position. Starting from this position, a further turning of shift element 30 is not possible because the torque on the locking cylinder is supported on the plane in front of or behind finger 28 via shift finger 28, two shift rails 18, 20 and two disengagement levers 36, 38. An inner tension is set. This position assists the controller in the calculation of a reference.

Figure 11:
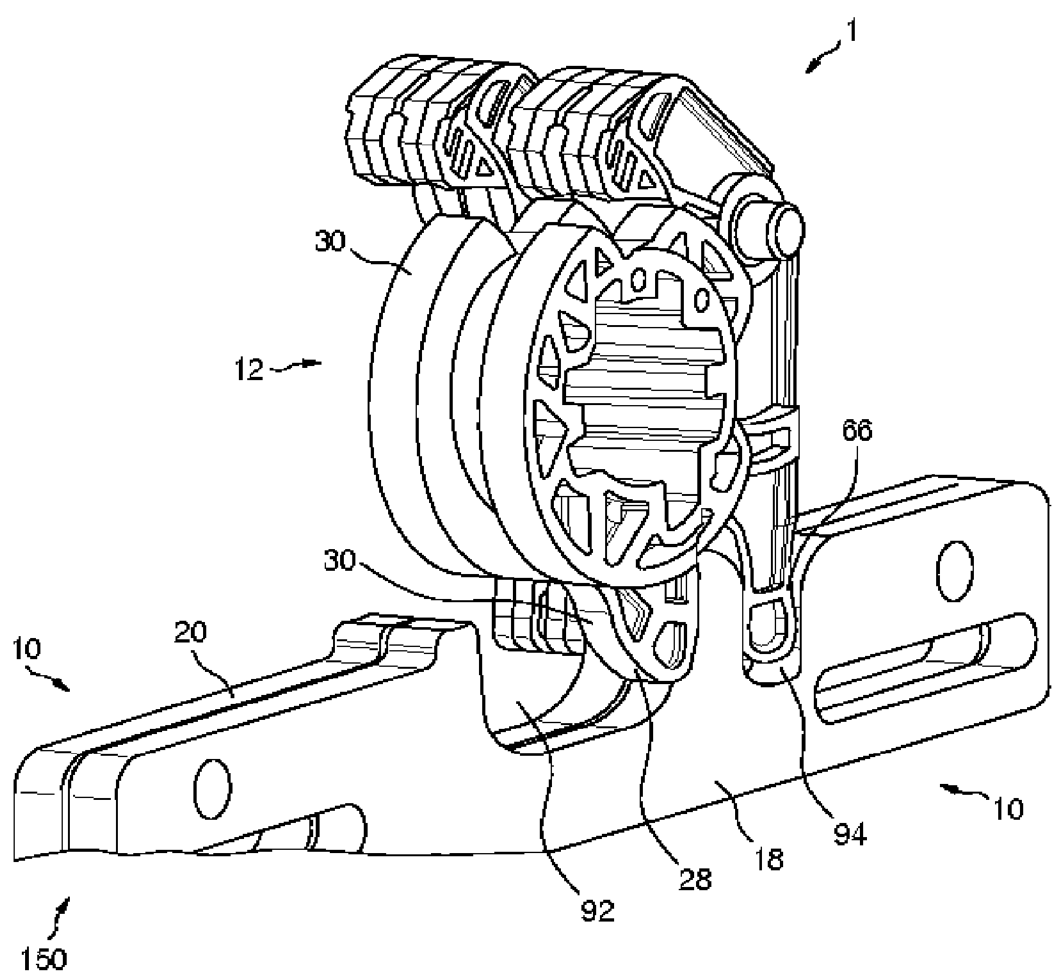

The disengagement of the two gears is also possible if shift element 30—as represented in FIG. 11—is axially displaced up to the limitation of plate 166 or 164 against the limit formed by plate 166 or 164. Shift finger 28 is therefore offset by a half distance of two shift rails of a partial transmission. The plates may be positioned accordingly in this context. The same or a corresponding tensile state is set as is described in relation to FIG. 10. Deviating from FIG. 10 or the tensile state according to FIG. 10, the shift finger is not supported against two shift rails 18, 20 in the position according to FIG. 11.

The described procedures for the simultaneous actuation of two shift rails 18, 20 gain significance in particular if the control unit or the control device loses all references due to an error. For this case or state, all references must be calculated or learned anew and specifically, if possible, without ending up in a dangerous situation or without dangerous situations occurring as a result (as, for example, undesired engagement of a gear).

FIGS. 12 to 14 show different design variants that may be used for different transmission types.

Variability of an "active interlock" core module or an actuator device 12 may be achieved if the "active interlock" geometries (disengagement flanks 48, 50, 52, 54 of shift element 30, locking cylinder 56 of shift element 30, locking cylinder 56 of shift element 30, disengagement flanks 70, 72, 74, 76 of disengagement lever, locking flank 78, 80 of disengagement lever; see FIG. 1) are turned enough toward shift finger 28, that they may be used in mirror image manner for the opposing side. However, in this context, there results the (apparent) problem that disengagement flank 74 collides with shift finger 28 during rotation. However, if the shape of shift finger 28 is changed and there is no engagement between shift finger 28 and the shift rail or the first cutout of the shift rail, the possibility presents itself of indirectly introducing the shift movement via disengagement lever 36, 38 (see FIGS. 12 to 14) into shift rail 18 or 20. From these modifications, application variants may be covered in which disengagement finger 32 or 34 (see FIGS. 12 to 14) is arranged turned within a 180° range.

The variation width is expressed in the arrangement and distribution of disengagement levers 36 or 38 (see FIGS. 12 to 14).

In the designs according to FIGS. 12 to 14, only secondary actuation elements 32, 34 or disengagement fingers 66, 68 are output elements 42, 44 of actuator device 12. Shift finger 28 in this case does not form an output element and therefore cannot engage directly in the shift mechanisms 14, 16 or shift rails 18, 20 of the transmission or in mouthpieces or cutouts arranged there. Only the disengagement fingers engage in these mouthpieces. However, disengagement levers 36, 38 are loaded by shift finger 28 to trigger a shift movement of a shift rail. Also according to designs 12 to 14, profiles 58 may be arranged in a plane that is offset with respect to the shift finger in the axial direction of the shift element. In this context, it may also be provided that a clearance 90 is formed according to the manner described above.

The designs according to FIGS. 1 to 11 may be combined, provided that nothing to the contrary has been said. In particular the exemplary embodiments according to FIGS. 6 to 11 may have a design according to FIGS. 1 to 5. Also the designs according to FIGS. 12 to 14 may be provided with features that were explained with reference to FIGS. 1 to 11.

As preferred embodiments and exemplary embodiments also show in particular, it has been possible according to the invention to find a component arrangement that transfers an "active interlock" functionality in a tolerance-sensitive manner to the gearshift inner controls. Furthermore, at least exemplary embodiments show that it has been possible according to the invention to find a component arrangement that does not require the shift rails of the transmission as an "active interlock" functional element. Moreover, it has been possible to find an "active interlock" geometry by means of the invention or its exemplary embodiments that are able to compensate tolerances in the disengagement of gears. Furthermore, it has been possible, as at least exemplary embodiments of the invention show, to integrate a gate functionality. Moreover, as exemplary embodiments of the invention show, a variability of application regarding different transmission types is achieved. The core module or "active interlock" core module according to the invention or the actuator device according to the invention is preferably used for a parallel-shift transmission or can be used for such. The disengagement levers or the disengagement fingers—as shown in the exemplary embodiments according to the figures—may each essentially be axially fixedly mounted. Preferably, they are only movable in the swiveling or rotational direction.

PARTS LIST

1 Transmission device
10 Transmission
12 Actuation device
14 Shift mechanism
16 Shift mechanism
18 Shift rail
20 Shift rail
22 Main actuator device
24 Secondary actuator device
26 Main actuator element
28 Shift finger
30 Shift element
32 Secondary actuator element
34 Secondary actuator element
36 Disengagement lever
38 Disengagement lever
40 Output element
42 Output element
44 Output element
46 Shifting shaft
48 Disengagement flank of 30
50 Disengagement flank of 30
52 Disengagement flank of 30
54 Disengagement flank of 30
56 Locking part, locking cylinder
56*a* Section of 56
56*b* Section of 56
56*c* Section of 56
58 Surface profile of 30
60 Surface depression
62 Surface depression
64 Surface elevation
64*b* Surface elevation
64*c* Surface elevation
65 Region
66 Disengagement finger
68 Disengagement finger
69 Radial contact surface
70 Disengagement flank of 36 or 38
72 Disengagement flank of 36 or 38
74 Disengagement flank of 36 or 38
76 Disengagement flank of 36 or 38
78 Locking flank
80 Locking flank
82 Surface profile of 36 or 38
84 Swivel axis of 36 or 38
86 Shaft for holding 36 or 38
88 Swivel axis of 28 or 30
90 Clearance of 30
91 Radial outer limitation of 30 in the plane of 28
92 First section in 18, 20; shift mouthpiece
94 Second section in 18, 20; disengagement mouthpiece
96 Direction of motion of 18, 20
98 Flank of 92
100 Flank of 92
102 Flank of 94
104 Flank of 94
106 Shift path
108 Bisecting line
110 Bisecting line
120 Section of 36
122 Section of 36
150 First partial transmission
152 Second partial transmission
154 Distance
156 Plate
158 Opening in 156
160 Cutout
162 Line
164 Plate
166 Plate
168 First depth of 36, 38
170 Second depth of 36, 38

What is claimed is:

1. An actuator device for a motor vehicle transmission, in which the transmission comprises:

at least two shafts;

a plurality of gear sets for the achievement of different gear steps; and a plurality of shift mechanisms, each of which may be actuated to produce or release a rotationally fixed shaft-gear connection, the plurality of shift mechanisms including first and second shift rails or first and second shift forks;

in which the actuator device comprises:

a main actuator device rotatable about a first axis and displaceable parallel to the first axis and having at least one shift finger that is movable about the first axis and parallel to the first axis to engage the first or second shift rail for the engagement of gears, wherein the main actuator device includes a first surface; and, a secondary actuator device rotatable about a second axis, different than the first axis, and having at least one disengagement finger, wherein each said disengagement finger is movable about the second axis to engage the first or second shift rail or to engage the first or second shift fork for the disengagement of gears, wherein the secondary actuator device includes a second surface;

wherein the main actuator device and the secondary actuator device cooperate to produce controlled relative movements of one of the at least one shift finger and one of the at least one disengagement finger;

during a shifting operation, the first and second surfaces are in contact;

the first and second surfaces are aligned, in a direction orthogonal to the first axis, with a first shift finger from the at least one shift finger.

2. The actuator device as described in claim 1, wherein at least one component of the main actuator device has at least one first surface section, including a first surface profile, and at least one component of the secondary actuation device has at least one second surface section, including a second surface profile, the at least one component of the main actuator device being mounted so as to be movable in relation to the at least one component of the secondary actuator device such that, in the case of prescribed movements of the component of the main actuator device, its first surface section becomes operatively engaged with at least one second surface section of the at least one component of the secondary actuator device to produce controlled relative movements of the one of the at least one shift finger and one of the at least one disengagement finger.

3. The actuator device as described in claim 1, wherein the first and second axes are spaced apart from each other and are parallel to each other.

4. An actuator device for a motor vehicle transmission as described in claim 1, in which the actuator device comprises:

a surface profile of the at least one disengagement finger;

a shift element that is provided with the at least one shift finger and with at least one surface profile, the shift element along with the at least one shift finger being able to swivel about the first axis for shifting into gear positions of the transmission and being movable into prescribed swivel positions in the first axis direction for the select operation; and, a plurality of disengagement levers, each of which swivels about a swivel axis that is set at a distance from the first axis of the shift element and each of which is provided with a disengagement finger for the operative engagement in a shift mechanism and with a surface profile, in which the at least one surface profile of the shift element, which is mounted offset with respect to the at least one shift finger in the direction of the first axis of the shift element or shift finger, can or does operatively engage with the surface profile of the at least one disengagement finger for the disengagement and/or locking of prescribed gears of the transmission during predetermined swivel movements of the at least one shift finger.

5. The actuator device as described in claim 4, wherein the at least one surface profile of the main actuator device or of the shift element that is specified for cooperation with at least one surface profile of the secondary actuator device is symmetrically formed and/or the surface profiles of secondary actuator device are each symmetrically designed.

6. The actuator device as described in claim 1, wherein the main actuator device has or is a shift element on which said at least one shift finger is designed and on which at least one surface profile is designed for the cooperation with at least one surface profile of the secondary actuator device.

7. The actuator device as described in claim 1, wherein the at least one shift finger includes an involute shape.

8. The actuator device as described in claim 1, wherein the main actuator device includes a shift element, disengagement levers, and at least one surface profile, wherein the secondary actuator device includes at least one surface profile, and wherein the shift element and/or the main actuator element or the at least one shift finger and the at least one surface profile of the main actuator device that is specified for cooperation with the at least one surface profile of the secondary device or of the disengagement levers is mounted in an axially movable and swiveling manner.

9. The actuator device as described in claim 1, wherein, the secondary actuator device has a plurality of disengagement elements, including disengagement levers, that are mounted so as to be movable in relation to each other and are identically shaped.

10. The actuator device as described in claim 1, further comprising disengagement elements, wherein the main actuator device includes a surface profile, wherein the disengagement elements each have a surface profile for the cooperation with the surface profile of the main actuator device and/or each have a disengagement finger from the at least one disengagement finger for the engagement in a shift mechanism of a transmission.

11. The actuator device as described in claim 1, further comprising disengagement elements, wherein the disengagement elements are each swivel-mounted relative to each other about parallel and/or concentric swivel axes.

12. The actuator device as described in claim 1, further comprising disengagement elements mounted on respective swivel axes, wherein the disengagement elements are each mounted in an essentially axially fixed manner with respect to a respective swivel axis.

13. The actuator device as described in claim 1, wherein the at least one disengagement finger forms radial contact surfaces for the operative contact with a mouthpiece or cutout of a shift mechanism.

14. The actuator device as described in claim 1, further comprising a shift element with at least one surface profile, wherein the at least one surface profile of the shift element is mounted axially offset with respect to the at least one shift finger.

15. The actuator device as described in claim 1, further comprising a shift element and a disengagement lever, wherein the shift element has a clearance in an axial region in which the at least one shift finger is disposed and in which the disengagement lever is able to swivel when engaging a gear by means of the at least one shift finger.

16. The actuator device as described in claim 1, further comprising a shift element and disengagement elements, wherein surface profiles of the shift element that are provided for the cooperation with surface profiles of the disengagement elements each have disengagement flanks for the actuation of the disengagement elements and/or at least one locking region, the at least one locking region including locking cylinders.

17. The actuator device as described in claim 1, further comprising a shift element and disengagement elements with surface profiles, the disengagement elements including disengagement levers, wherein the surface profiles of the disengagement elements each have at least one locking flank for cooperation with at least one locking region, of the shift element, the at least one locking region including a locking cylinder, it being provided that by means of the at least one locking region, of the shift element, and by means of the locking flanks of a disengagement element, this disengagement element may be set in a prescribed position, and/or the surface profiles of the disengagement elements, the disengagement elements including disengagement levers, have disengagement flanks that are able to be loaded by disengagement flanks of the shift element for the movement of the disengagement element for the disengagement of gears of the transmission.

18. The actuator device as described in claim 1, wherein, during a turning movement of said main actuator device, said contact of said first surface with said second surface causes a turning movement in said secondary actuator device.

19. A motor vehicle transmission device, comprising:

a transmission that has at least two shafts and a plurality of gear sets to produce different gear steps and a plurality of shift mechanisms by means of which rotationally fixed shaft-gear connections are produced and released in order to engage or disengage gears of the transmission, for which purpose the shift mechanisms may each be operated; and, an actuator device for the actuation of the shift mechanisms in order to effect the engagement and disengagement of gear steps of the transmission, a main actuator device rotatable about a first axis and displaceable parallel to the first axis and having at least one shift finger that is movable about the first axis and parallel to the first axis for the engagement of gears; and, a secondary actuator device rotatable about a second axis, different than the first axis, and having at least three disengagement fingers, wherein two adjacent said disengagement fingers are movable, independent of remaining disengagement fingers in the at least three disengagement fingers, for the disengagement of gears, wherein the main actuator device and the secondary actuator device cooperate to produce controlled relative movements of one of the at least one shift finger and one of the at least one disengagement finger.

20. A motor vehicle transmission device as described in claim 19, wherein the main actuator device can be moved into the end regions of shift gates to which one shift mechanism, each is assigned, whereupon each shift mechanism assigned to the associated shift gate is operatively engaged in such a manner that a gear assigned to the particular end region is engaged in the transmission, it being possible after the engagement of a gear to move the main actuator element out of the end region assigned to this gear into the shift gate center of the same shift gate without the engaged gear being disengaged again as a result in which the main actuator device and the secondary actuation device cooperate in such a manner that, during a movement of main actuator element into an end region of a shift gate to which a gear is assigned, at least one disengagement finger acts on at least one shift mechanism, which is assigned to another shift gate, in such a manner that it is ensured that the gears assigned to this shift mechanism are disengaged before a gear is engaged in the transmission by means of the main actuator element, and in which the shifting of a gear by means of the main actuator element and the assurance that gears that are each assigned to a different shift mechanism are disengaged is guaranteed independently of tolerances of the transmission or the shift mechanisms.

21. A motor vehicle transmission device as described in claim 19, in which, each of the shift mechanisms has a component, including a shift rail or shift fork, in which the actuator device may engage directly, and, in which the at least one shift finger and the at least one disengagement finger, regarding tolerances, are independent of the components of the shift mechanisms in which the actuator device may engage or does engage directly.

22. The transmission device as described in claim 19, wherein, through predetermined movements of the at least one shift finger in the shift direction, a shift mechanism is acted upon in such a manner that a prescribed gear of the transmission that is assigned to this shift mechanism is engaged, and in which the main actuator device and the secondary actuator device are operatively engaged in such a manner that, during this movement of the at least one shift finger in the shift direction, at least one disengagement finger is operatively engaged with at least one other shift mechanism in order to ensure that gears that are assigned to another shift mechanism have been and/or are disengaged before the gear is engaged by means of the at least one shift finger.

23. The transmission device as described in claim 19, wherein shift rails or shift forks are provided, each of which is a component of a shift mechanism, and a cutout or mouthpiece, including a shift mouthpiece or disengagement mouthpiece, is formed in each of these shift rails for the cooperation with the actuator device.

24. The transmission device as described in claim 23, wherein the actuator includes at least one disengagement element, wherein each disengagement element or each disengagement finger of the actuator device is in permanent engagement with a the disengagement mouthpiece.

25. The transmission device as described in claim 19, wherein the shift mechanisms include shift forks or shift rails, wherein the shift mechanisms, have a shift mouthpiece, for the engagement of a shift finger and a disengagement mouthpiece, for the permanent engagement of a disengagement finger of the actuator device.

26. The transmission device as described in claim 19, further comprising a shift element, wherein by means of a swiveling of the shift element it is possible to act on shift mechanisms in such a manner that, starting from a neutral position, a gear may be engaged in the transmission and the gear may be disengaged again via a swiveling of the shift element, shift paths for engagement and disengagement in the transmission being identical and a swivel angle of the shift element when swiveled to engage the gear being larger than a swivel angle of the shift element when swiveled for disengagement of the gear.

27. The transmission device as described in claim 26, further comprising a shift lever, wherein, when the shift lever is swiveled for the engagement of a gear, it is possible to effect the disengagement of a different gear of the transmission by means of this swivel movement.

28. A motor vehicle drive train comprising an internal combustion machine and at least one drive axle for holding drive wheels that is driven by the internal combustion engine and a transmission disposed between the internal combustion engine and the drive axle, said transmission comprising first and second parallel shafts and a plurality of gear sets to produce different gear steps and a plurality of shift mechanisms by means of which rotationally fixed shaft-gear connections are produced and released in order to engage or disengage respective gears from the plurality of gear sets, for which purpose the shift mechanisms may each be operated;

an actuator device for the actuation of the shift mechanisms in order to effect the engagement and disengagement of gear steps of the transmission;

a main actuator device rotatable about a first axis for the first shaft and displaceable parallel to the first axis and having at least one shift finger that is movable for the engagement of the respective gears; and, a secondary actuator device in contact with the main actuator device and rotatable about the second shaft having at least one disengagement finger, wherein each said disengagement finger is movable for the disengagement of the respective gears wherein the main actuator device and the secondary actuator device cooperate to produce controlled relative movements of one of the at least one shift finger and one of the at least one disengagement finger and wherein the main actuator is displaceable parallel to the first axis and with respect to the secondary actuator.

* * * * *